(12) United States Patent
Choi et al.

(10) Patent No.: US 8,577,203 B2
(45) Date of Patent: *Nov. 5, 2013

(54) SENSORY EFFECT MEDIA GENERATING AND CONSUMING METHOD AND APPARATUS THEREOF

(75) Inventors: Bum-Suk Choi, Daejon (KR); Sanghyun Joo, Daejon (KR); Hae-Ryong Lee, Daejon (KR); Kwang-Roh Park, Daejon (KR); Chae-Kyu Kim, Daejon (KR); Munchurl Kim, Daejon (KR); Shinjee Pyo, Seoul (KR); Muhammad Syah Houari, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 732 days.

This patent is subject to a terminal disclaimer.

(21) Appl. No.: 12/738,536

(22) PCT Filed: Oct. 16, 2008

(86) PCT No.: PCT/KR2008/006128
§ 371 (c)(1),
(2), (4) Date: Jul. 12, 2010

(87) PCT Pub. No.: WO2009/051428
PCT Pub. Date: Apr. 23, 2009

(65) Prior Publication Data
US 2012/0281138 A1    Nov. 8, 2012

Related U.S. Application Data

(60) Provisional application No. 60/980,184, filed on Oct. 16, 2007.

(30) Foreign Application Priority Data

Dec. 20, 2007  (KR) .................. 10-2007-0134718

(51) Int. Cl.
*H04N 9/80*    (2006.01)

(52) U.S. Cl.
USPC ........................................... 386/239

(58) Field of Classification Search
USPC ............... 348/460, 553, 461, 500, 51, 143; 178/18.1; 345/633; 707/769; 386/239, 386/262

See application file for complete search history.

(56) References Cited

U.S. PATENT DOCUMENTS 6,778,998 B2    8/2004 Kondo et al.
7,068,290 B2 *  6/2006 Bennett et al. ................ 345/633

(Continued)

FOREIGN PATENT DOCUMENTS

KR    1019990026138    4/1999
KR    1020070013384    1/2007

OTHER PUBLICATIONS

International Search Report for Application No. PCT/KR2008/006128, dated Mar. 23, 2009.

*Primary Examiner* — Paulos M Natnael
(74) *Attorney, Agent, or Firm* — Nelson Mullins Riley & Scarborough LLP

(57) ABSTRACT

Provided is a method and apparatus for generating and consuming sensory effect media. The method for generating sensory effect media includes receiving sensory effect information about sensory effects that are applied to media, and generating sensory effect metadata including the received sensory effect information. The sensory effect metadata includes effect description information for describing the sensory effects and device control description information for controlling devices that perform the sensory effects.

16 Claims, 13 Drawing Sheets

(56) References Cited

U.S. PATENT DOCUMENTS

| | | | |
|---|---|---|---|
| 7,911,328 B2* | 3/2011 | Luden et al. | 340/407.1 |
| 2008/0223627 A1* | 9/2008 | Lacroix et al. | 178/18.01 |
| 2008/0297654 A1* | 12/2008 | Verberkt et al. | 348/500 |
| 2010/0268745 A1* | 10/2010 | Choi et al. | 707/802 |
| 2010/0274817 A1* | 10/2010 | Choi et al. | 707/802 |
| 2010/0275235 A1* | 10/2010 | Joo et al. | 725/74 |
| 2011/0125787 A1* | 5/2011 | Choi et al. | 707/769 |
| 2011/0125788 A1* | 5/2011 | Joo et al. | 707/769 |
| 2011/0125789 A1* | 5/2011 | Joo et al. | 707/769 |
| 2011/0125790 A1* | 5/2011 | Choi et al. | 707/769 |
| 2011/0188832 A1* | 8/2011 | Choi et al. | 386/239 |
| 2011/0241908 A1* | 10/2011 | Han et al. | 341/20 |
| 2011/0243524 A1* | 10/2011 | Cho et al. | 386/230 |
| 2012/0033937 A1* | 2/2012 | Kim et al. | 386/230 |

* cited by examiner

SENSORY EFFECT MEDIA GENERATING AND CONSUMING METHOD AND APPARATUS THEREOF

RELATED APPLICATIONS

This application is a 35 U.S.C. §371 national stage filing of PCT Application No. PCT/KR2008/006128 filed on Oct. 16, 2008, which claims priority to, and the benefit of, U.S. Patent Application No. 60/980,184 filed Oct. 16, 2007 and Korean Patent Application No. 10-2007-0134718 filed on Dec. 20, 2007. The contents of the aforementioned applications are hereby incorporated by reference.

TECHNICAL FIELD

The present invention relates to a method and apparatus for generating and consuming media, and a computer-readable recording medium storing media metadata; and, more particularly, to a method and apparatus for generating and consuming sensory effect media, and a computer-readable recording medium storing sensory effect media metadata.

This work was supported by the IT R&D program of MIC/IITA [2007-S-010-01, "Development of Ubiquitous Home Media Service System based on SMMD"].

BACKGROUND ART

In general, media includes audio and video. The audio may be voice or sound, and the video may be motion pictures or images. When a user consumes or reproduces the media, the user can obtain information about the media by using metadata. The metadata is data about the media. Meanwhile, a device for reproducing media has also advanced from an analog-type device for reproducing analog media to a digital-type device for reproducing digital media.

Generally, an audio output device such as a speaker and a video output device such as a display device are used for reproducing the media.

FIG. 1 is a diagram for describing a media technology according to the related art. Referring to FIG. 1, media 102 is outputted to a user using a media consuming method 104. The media consuming method 104 according to the related art only includes devices for outputting audio and video.

Many researches have been made to develop a technology for effectively providing media to users. For example, an audio signal evolves into a multi-channel signal or a multi-object signal, and video technology has also advanced to high definition display, a stereoscopic image, or a 3-D image display technology.

Related to such a media technology, a media concept and a multimedia processing technology have also advanced. For example, Moving Picture Experts Group (MPEG) technologies were introduced from MPEG-1 to MPEG-21 as well as MPEG-2, MPEG-4, and MPEG-7. MPEG-1 defines a format for storing audio and video, MPEG-2 defines specifications for transmitting media, MPEG-4 defines an object-based media structure, MPEG-7 defines specifications for metadata of media, and MPEG-21 defines a framework for distributing media.

As described above, the media according to the related art is limited to audio and video. That is, it is impossible to maximize the effect of reproducing the media by interacting with various devices.

DISCLOSURE

Technical Problem

An embodiment of the present invention is directed to providing a method and apparatus for generating and consuming sensory effect media to maximize the effect of reproducing media.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for generating sensory effect media, including receiving sensory effect information about sensory effects that are applied to media, and generating sensory effect metadata including the received sensory effect information, wherein the sensory effect metadata includes effect description information for describing the sensory effects and device control description information for controlling devices that perform the sensory effects.

In accordance with another aspect of the present invention, there is provided an apparatus for generating sensory effect media, including an input unit for receiving sensory effect information about sensory effects that are applied to media, and a sensory effect metadata generator for generating sensory effect metadata including the received sensory effect information, wherein the sensory effect metadata includes effect description information for describing the sensory effects and device control description information for controlling devices that perform the sensory effects.

In accordance with another aspect of the present invention, there is provided a method for consuming sensory effect media, including receiving sensory effect metadata including sensory effect information about sensory effects that are applied to media, and searching for devices that perform the sensory effects and controlling the devices according to the sensory effect information, wherein the sensory effect metadata includes effect description information for describing the sensory effects and device control description information for controlling devices that perform the sensory effects.

In accordance with another aspect of the present invention, there is provided an apparatus for consuming sensory effect media, including an input unit for receiving sensory effect metadata having sensory effect information about sensory effects that are applied to media, and a controller for searching for devices that perform the sensory effects and controlling the devices according to the sensory effect information, wherein the sensory effect metadata includes effect description information for describing the sensory effects and device control description information for controlling devices that perform the sensory effects.

In accordance with another aspect of the present invention, there is provided a computer-readable recording medium storing metadata, the metadata including sensory effect metadata including sensory effect information for sensory effects that are applied to media. The sensory effect metadata may include effect description information for describing the sensory effects and device control description information for controlling devices that perform the sensory effects according to the effect description information, and the devices are searched for and controlled according to the sensory effect metadata.

Advantageous Effects

The method and apparatus for generating and consuming sensory effect media of the present invention can maximize the effect of reproducing media.

BEST MODE FOR THE INVENTION

Figure 1:
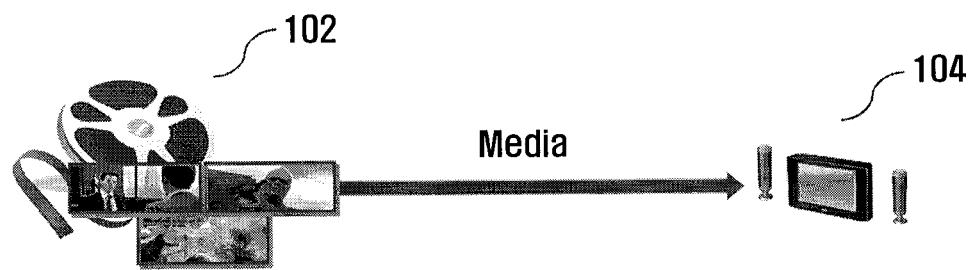
FIG. 1 illustrates a conventional media technology.

Following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

Also, all the detailed description on the principles, viewpoints and embodiments and particular embodiments of the present invention should be understood to include structural and functional equivalents to them. The equivalents include not only currently known equivalents but also those to be developed in future, that is, all devices invented to perform the same function, regardless of their structures.

For example, block diagrams of the present invention should be understood to show a conceptual viewpoint of an exemplary circuit that embodies the principles of the present invention. Similarly, all the flowcharts, state conversion diagrams, pseudo codes and the like can be expressed substantially in a computer-readable media, and whether or not a computer or a processor is described distinctively, they should be understood to express various processes operated by a computer or a processor.

Functions of various devices illustrated in the drawings including a functional block expressed as a processor or a similar concept can be provided not only by using hardware dedicated to the functions, but also by using hardware capable of running proper software for the functions. When a function is provided by a processor, the function may be provided by a single dedicated processor, single shared processor, or a plurality of individual processors, part of which can be shared.

The apparent use of a term, 'processor', 'control' or similar concept, should not be understood to exclusively refer to a piece of hardware capable of running software, but should be understood to include a digital signal processor (DSP), hardware, and ROM, RAM and non-volatile memory for storing software, implicatively. Other known and commonly used hardware may be included therein, too.

In the claims of the present specification, an element expressed as a means for performing a function described in the detailed description is intended to include all methods for performing the function including all formats of software, such as combinations of circuits for performing the intended function, firmware/microcode and the like.

To perform the intended function, the element is cooperated with a proper circuit for performing the software. The present invention defined by claims includes diverse means for performing particular functions, and the means are connected with each other in a method requested in the claims. Therefore, any means that can provide the function should be understood to be an equivalent to what is figured out from the present specification.

Other objects and aspects of the invention will become apparent from the following description of the embodiments with reference to the accompanying drawings, which is set forth hereinafter. The same reference numeral is given to the same element, although the element appears in different drawings. In addition, if further description on the related prior arts is determined to obscure the point of the present invention, the description is omitted. Hereafter, preferred embodiments of the present invention will be described in detail with reference to the drawings.

An apparatus for generating and consuming (or reproducing) media according to the related art outputs and displays audio and video only. However, human beings have not only a visual sense and an auditory sense but also an olfactory sense and a tactile sense. Lately, many researches have been made to develop a device that stimulates the five senses of a user, such as the tactile sense and the olfactory sense.

Meanwhile, home appliances were controlled generally by an analog signal. However, the home appliances have advanced to be controlled by a digital signal.

Accordingly, a concept of media has also advanced to include not only audio and/or video data but also sensory effect information to control various devices that stimulate the olfactory sense and the tactile sense in order to maximize the effect of reproducing the media.

Recently, a single media single device (SMSD) based service is available. The SMSD based service is a media service that enables a user to reproduce one media through one device. However, many researches have been made to develop a single media multi device (SMMD)-based service for maximizing the effect of reproducing media in Ubiquitous home. The SMMD based service is a media service that enables a user to reproduce one media through a plurality of devices by interacting with the plurality of devices. Therefore, it is necessary to advance from media to sensory effect media that enables a user not only to watch/hear the media but also to sense the sensory effects of the media through the five senses of the user. It is expected that the sensory effect media will expand a media industry and a market of a sensory effect device and provide rich experience to a user by maximizing the effect of reproducing the media. Therefore, the sensory effect media encourage users to consume more media.

Figure 2:
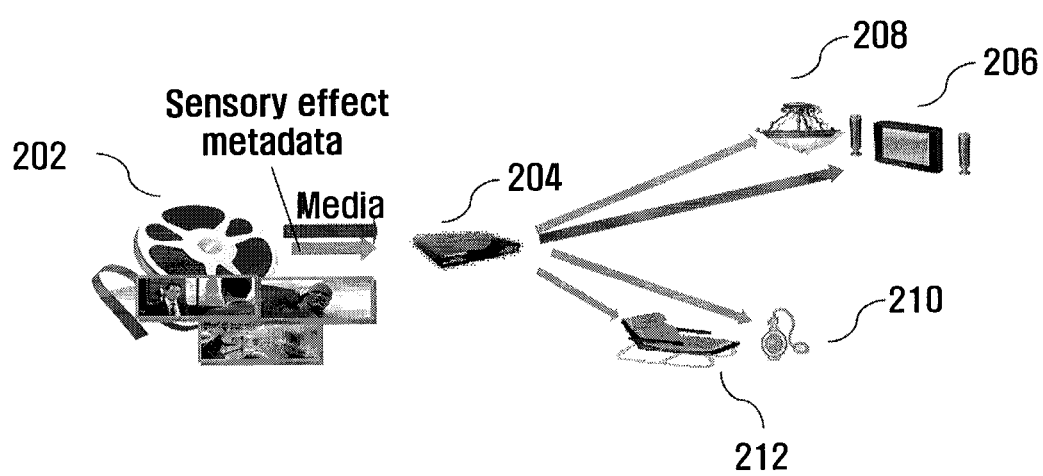
FIG. 2 is a conceptual diagram describing sensory effect media in accordance with an embodiment of the present invention.

FIG. 2 is a conceptual diagram describing sensory effect media in accordance with an embodiment of the present invention. Referring to FIG. 2, media 202 and sensory metadata are inputted to a sensory effect media consuming method 204. For example, the media 202 may be provided from a media provider (not shown), and the sensory effect metadata may be provided from a sensory effect provider (not shown).

The media 202 includes audio and video, and the sensory effect metadata includes sensory effect information for reproducing sensory effects. The sensory effect metadata may include all information that can maximize the effect of reproducing the media 202. For example, the sensory effects for a visual sense, an olfactory sense, and a tactile sense are shown in FIG. 2. Accordingly, the sensory effect information includes visual effect information, olfactory effect information, and tactile effect information.

The sensory effect media consuming method 204 according to the present embodiment controls a media output device 206 to receive and reproduce the media 202. The sensory effect media consuming method 204 controls sensory effect devices 208, 210, and 222 based on the visual effect information, the olfactory effect information, and the tactile effect information. For example, a dimmer 208 is controlled according to the visual effect information, a perfumer 210 is controlled according to the olfactory effect information, and a vibrating device 212 such as a chair is controlled according to the tactile effect information.

When a device reproduces video including a scene of lightning and thunder, the dimmer 208 is turned on and off, or when a device reproduces video having a scene of foods or a green field, the perfumer 210 is controlled. Furthermore, when a device reproduces video having a scene of car chasing, the vibrating device 212 is controlled. Therefore, the corresponding sensory effects can be provided to users with the video.

The sensory effect metadata includes effect description information for describing sensory effects and device control description information for controlling devices that perform sensory effects according to the effect description information. Various users may be enabled to maximally reproduce sensory effects using sensory effect devices that the user owns by defining information to be included in the sensory effect information as described above. For example, if a user owns the dimmer 208 only, the user may reproduce the sensory effects by controlling only the dimmer 210. If a user owns the dimmer 208 and the perfumer 210, the user may reproduce the sensory effects more realistically by controlling not only the dimmer 208 but also the perfumer 210. The sensory effect metadata may further include general information having sensory effect metadata generation information.

The effect description information may include effect type information about a type of sensory effect, device identification information about identification of a device, device condition information for reproducing sensory effects, and initial effect information of a device. The device control description information may include reference information for the device identification information, synchronization information for synchronizing media with sensory effects, and parameter information for controlling a device.

Since it is necessary to synchronize such sensory effects with audio or video of the media, the control description information may include synchronization information for synchronizing the media with the sensory effect.

Hereinafter, the apparatus and method for generating and consuming sensory effect media according to the present invention will be described in detail.

<Generation of Sensory Effect Media>

Hereinafter, a method and apparatus for generating sensory effect media according to an embodiment of the present invention will be described.

The method for generating sensory effect media according to the present embodiment includes receiving sensory effect information on sensory effects applied to media, and generating sensory effect metadata including the received sensory effect information. The sensory effect metadata includes effect description information for describing sensory effects and device control description information for controlling devices that perform the sensory effects. Accordingly, a user owning various types of sensory effect devices is enabled to reproduce proper sensory effects based on the generated sensory effect metadata. The generated sensory effect metadata may be transferred to a user through various paths.

The method may further include transmitting the sensory effect metadata to a user terminal. If a sensory effect service provider generates the sensory effect metadata, the sensory effect metadata may be directly provided to a user independently from the media. For example, if a user already owns media of a predetermined movie, the user may request sensory effect metadata of the predetermined movie to a sensory effect service provider, receive the requested sensory effect metadata from the sensory effect service provider, and reproduce sensory effects of the predetermined movie using the sensory effect metadata.

The method may further include generating sensory effect media by packaging the generated sensory effect metadata and the media, and transmitting the sensory effect media to the user terminal. The sensory effect service provider may provide the media and the sensory effect metadata at the same time. The sensory effect service provider generates a sensory effect metadata, generates sensory effect media by combining or packaging the generated sensory effect metadata with the media, and transmits the generated sensory effect media to a user terminal. The sensory effect media may be formed in a file of a sensory effect media format to reproduce sensory effects. The sensory effect media format may be a standard file format for sensory effect reproduction.

The sensory effect information may include special effect information for reproducing sensory effects and control information for controlling devices that perform the sensory effects. The sensory effect information may further include device information on devices that perform sensory effects.

The sensory effect metadata may further include general information having sensory effect metadata generation information. The effect description information may include effect type information about a type of sensory effect, device identification information of devices, condition information of devices that perform sensory effect, and initial effect information of devices. The device control description information may include reference information for device identification information, synchronization information for synchronizing media and sensory effects, and parameter information for controlling devices.

The sensory effect information may differ according to scenes of media. The sensory effect may include susceptibility as well as the five senses of sensory organs. For example, the special effect information may information for moving curtains or vibrating windows for making audiences of a horror movie to fear. The sensory effect information may include information for turning on or off dimmers for reproducing the special effect of lighting or thunder. The device information is information on devices that perform the sensory effects. Such device control description information includes control information for controlling a device that reproduces sensory effects according to the sensory effect information. The device control description information may include synchronization information for synchronizing the media with the sensory effects. The synchronization information makes the sensory effects to be reproduced according to the progression of scenes of media.

Figure 3:
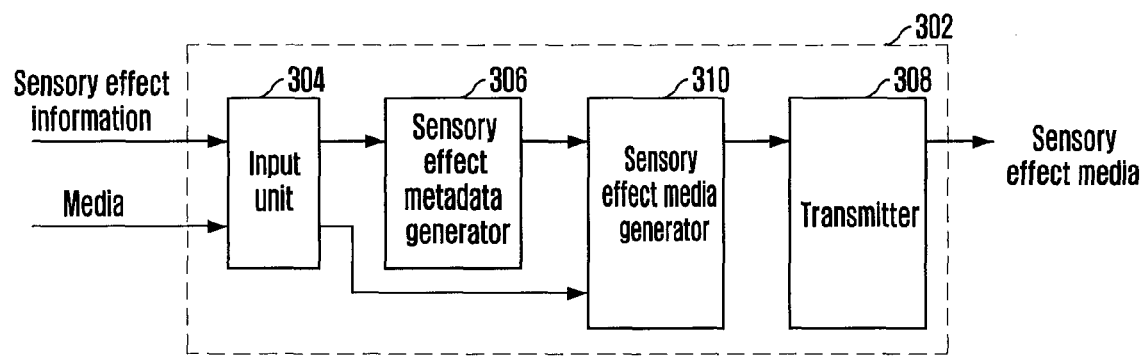
FIG. 3 is a diagram illustrating an apparatus for generating sensory effect media in accordance with an embodiment of the present invention.

FIG. 3 is a diagram illustrating an apparatus for generating a sensory effect media in accordance with an embodiment of the present invention. Referring to FIG. 3, the sensory effect media generating apparatus 302 includes an input unit 304 for receiving sensory effect information on sensory effects that are applied to media, and a sensory effect metadata generator 306 for generating sensory effect metadata including the received sensory effect information. The sensory effect metadata includes effect description information for describing sensory effect and device control description information for controlling devices that perform sensory effects according to the effect description information. The sensory effect media generating apparatus 302 may further include a transmitter 308 for transmitting the sensory effect metadata to a user terminal.

The sensory effect generating apparatus may further include a sensory effect generator for generating sensory effect media by packaging the generated sensory effect metadata and the media. The transmitter may transmit the sensory effect media to the user terminal. In case of generating the sensory effect media, the input unit 304 may receive media and the sensory effect media generator 310 generates the sensory effect media by combining or packaging the received media and the sensory effect metadata generated by the sensory effect metadata generator 306.

The sensory effect metadata may further include general information having sensory effect metadata generation information. The effect description information may includes effect type information about a type of sensory effect, device identification information of devices, condition information of devices that perform sensory effect, and initial effect information of devices. The device control description information may include reference information for the device identification information, synchronization information for synchronizing media with sensory effects, and parameter information for controlling devices.

The sensory effect metadata may further include general information having sensory effect metadata generation information. The effect description information may include effect type information about a type of sensory effect, device identification information of devices, condition information of device that perform sensory effects, and initial effect information of devices. The device control description information may include reference information for the device identification information, synchronization information for synchronizing media with sensory effects, and parameter information for controlling devices.

Since other details of the sensory effect generating apparatus are identical to those of the sensory effect media generating method, the description thereof is omitted.

<Consumption of Sensory Effect Media>

Hereinafter, a method and apparatus for consuming sensory effect media according to an embodiment of the present invention will be described.

A method for consuming sensory effect media according to the present embodiment includes receiving sensory effect metadata including sensory effect information on sensory effects that are applied to media, and searching for devices capable of reproducing the sensory effects and controlling the devices according to the sensory effect information. The sensory effect metadata includes effect description information for describing sensory effects and device control description information for controlling devices that perform sensory effects according to the effect description information. If a user terminal already has media, the sensory effect metadata is received together with media. When the sensory effect metadata is received, the sensory effect metadata is analyzed to determine what kinds of sensory effect information are included therein, and devices owned by a user are searched for to reproduce the sensory effects. Then, the sensory effects are properly reproduced according to the combination of the devices of the user by controlling the searched devices.

While receiving sensory effect metadata, the media may be received too. That is, the sensory effect metadata maybe received together with the media. When the sensory effect metadata and the media are received together, the media may be packaged with the sensory effect metadata. The packaging of the media and the sensory effect metadata may be a file of a sensory effect media format.

The sensory effect metadata may further include general information having sensory effect metadata generation information. The effect description information may include effect type information about a type of sensory effect, device identification information of devices, condition information of devices that perform sensory effect, and initial effect information of devices. The device control description information may include reference information for device identification information, synchronization information for synchronizing media and sensory effects, and parameter information for controlling devices.

Since other details of the sensory effect media consuming method and apparatus are identical to those of the generation of sensory effect media, it is omitted here.

Figure 4:
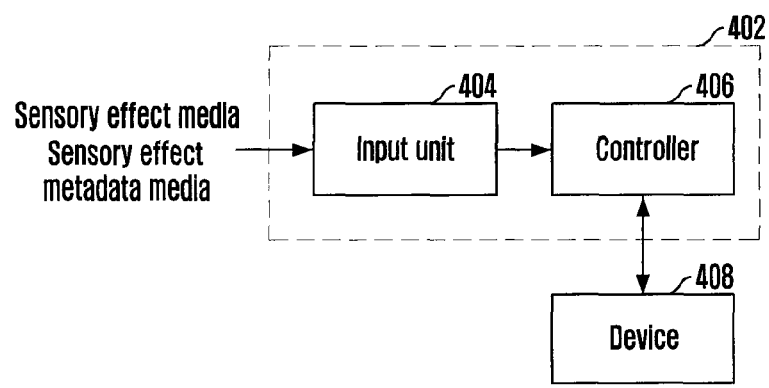
FIG. 4 is a diagram illustrating an apparatus for consuming a sensory effect media in accordance with an embodiment of the present invention.

FIG. 4 describes an apparatus for consuming a sensory effect media in accordance with an embodiment of the present invention. Referring to FIG. 4, the sensory effect media consuming apparatus 402 includes an input unit 404 for receiving sensory effect metadata having sensory effect information on sensory effects that are applied to media, and a controller 406 for searching for devices 408 that reproduce the sensory effects and controlling the devices according to the sensory effect information. The sensory effect metadata includes effect description information for describing sensory effects and device control description information for controlling devices that perform sensory effects according to the effect description information. Here, the sensory effect media consuming apparatus 402 is not limited to a device for reproducing the sensory effect only. The sensory effect media consuming apparatus 402 may be any device that can consume the media, for example, a cellular phone, a mobile terminal such as a personal media player (PMP), TV, and an audio system.

The input unit 404 may further receive the media. In this case, the media is packaged with the metadata.

The sensory effect metadata may further include general information having sensory effect metadata generation information. The effect description information may include effect type information about types of sensory effects, identification information of devices, condition information of devices that perform sensory effect, and initial effect information of devices. The device control description information may include reference information for device identification information, synchronization information for synchronizing media and sensory effects, and parameter information for controlling devices.

Since other details of the sensory effect media consuming apparatus are identical to that of the generation of the sensory effect media, the description thereof is omitted here.

Hereinafter an overall system for reproducing sensory effects according to an embodiment of the present invention will be described.

Figure 5:
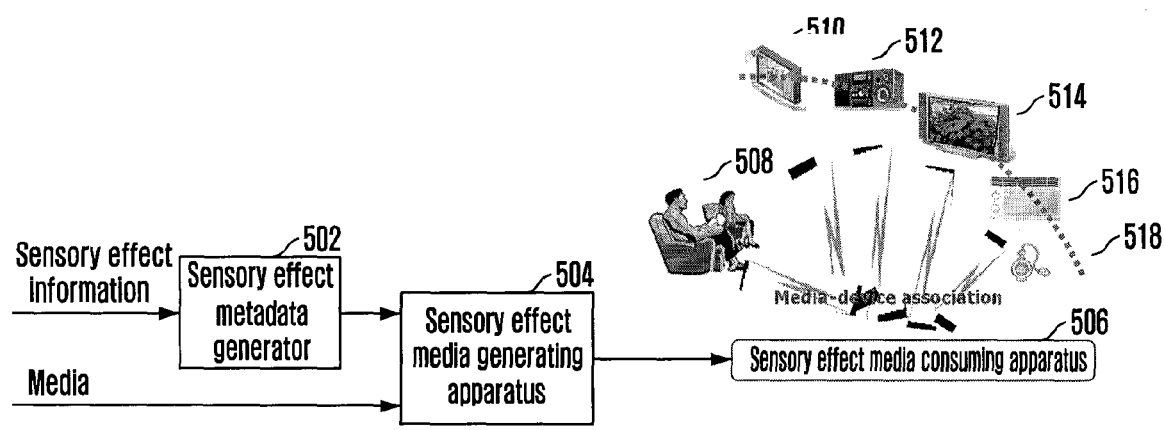
FIG. 5 is a conceptual diagram describing the reproduction of sensory effects in accordance with an embodiment of the present invention.

FIG. 5 describes reproducing sensory effects in accordance with an embodiment of the present invention. Referring to FIG. 5, the sensory effect metadata generator 502 receives sensory effect information and generates sensory effect metadata. The media may be transferred to a user independently from the sensory effect metadata. However, the media is transferred together with the sensory effect metadata to the user in FIG. 5. The sensory effect media generating apparatus 504 generates the sensory effect media using the media and the sensory effect metadata generated by the sensory effect metadata generator 502. The sensory effect media may be formed in a predetermined file format for providing the sensory effect media.

The sensory effect media generated by the sensory effect media generating apparatus 504 is transferred to the sensory effect media consuming apparatus 506. The sensory effect media consuming apparatus 506 searches for sensory effect devices that a user owns. In FIG. 5, a user owns a digital TV 514, a vibration chair 508, a dimmer 510, an audio system 512, an air-conditioner 516, and a perfumer 518. The sensory effect media generating apparatus 504 senses the sensory effect devices of the user, for example, the vibration chair 508, the dimmer 510, the audio system 512, the air-conditioner 516, and the perfumer 518, and controls the searched sensory effect devices to reproduce sensory effects. The sensory effect media generating apparatus 504 also synchronize scenes reproduced at the digital TV 514 with the sensory effect devices.

The sensory effect media consuming apparatus 506 may be connected to the sensory effect devices 508, 510, 512, 514, 516, and 518 through a network in order to control the sensory effect devices. For example, various network technologies such as LonWorks and universal plug and play (UPnP) may be applied to.

Meanwhile, MPEG media technologies such as MPEG-7 and MPEG-21 may be applied together in order to effectively provide media.

Hereinafter, embodiments of the present invention will be described based on subjects of providing and consuming services, such as a sensory effect service provider for providing a sensory effect service, a media service provider for providing media, and a user for reproducing the sensory effects.

FIGS. 6 to 9 describes various embodiments of the present invention.

Figure 6:
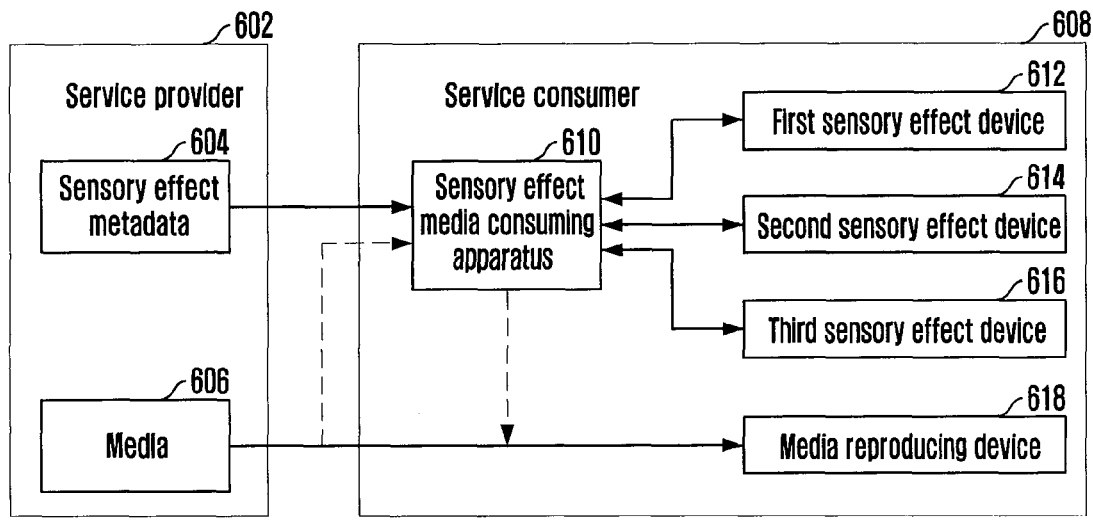
FIG. 6 is a block diagram illustrating an apparatus for generating and consuming sensory effect media in accordance with a first embodiment of the present invention.

FIG. 6 is a block diagram illustrating an apparatus for generating and consuming sensory effect media in accordance with a first embodiment of the present invention. Referring to FIG. 6, a service provider 602 transmits sensory effect metadata 604 including sensory effect information and media 606 to a service consumer 608. The service provider 602 provides media and information for reproducing sensory effects of the media to the service consumer 605 at the same time. The service provider 605 may include a broadcasting service provider. The service consumer 608 receives the sensory effect metadata 604 including the sensory effect information and the media 606. The received media 606 is reproduced by a media reproducing device 618, and the received sensory effect metadata 604 is inputted to the sensory effect media consuming apparatus 610. The sensory effect media consuming apparatus 610 is connected to first, second, and third sensory effect devices 612, 614, and 616 through a network and controls the first, second, and third sensory effect devices 612, 614, and 616 according to the received sensory effect metadata 604. The sensory effect media consuming apparatus 610 receives the media 606 for synchronizing reproducing the media 606 with reproducing the sensory effects by the first to third sensory effect devices 612, 614, and 616 and controls the media reproducing device 618 and the sensory effect devices 612, 614, and 616.

Figure 7:
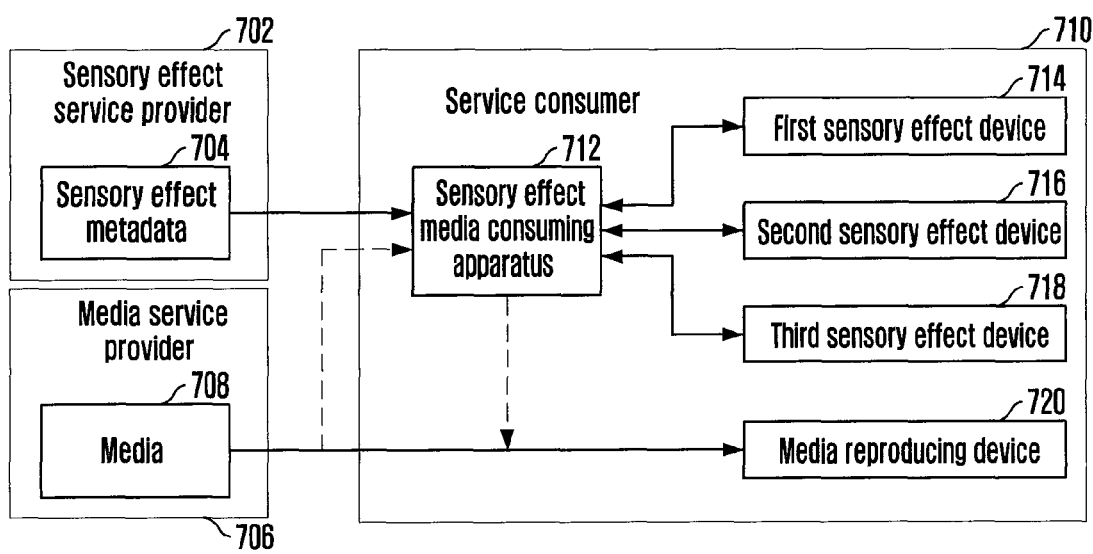
FIG. 7 is a block diagram illustrating an apparatus for generating and consuming sensory effect media in accordance with a second embodiment of the present invention.

FIG. 7 is a block diagram illustrating an apparatus for generating and consuming sensory effect media in accordance with a second embodiment of the present invention. Referring to FIG. 7, a sensory effect service provider 702 for providing a sensory effect service is separated from a media service provider 706 for providing media 708. The media service provider is a service provider who provides media 708. The sensory effect service provider 702 is a service provider who provides sensory effect metadata 704 including sensory effect information for reproducing sensory effects in order to provide a sensory effect service for the media 708. The sensory effect service provider 702 transmits the sensory effect metadata 704 to the service consumer 710, and the media service provider 706 transmits the media 708 to the service consumer 710. The transmitted media 708 is reproduced by a media reproducing device 720 of the service consumer 710, and the sensory effect media consuming apparatus 712 controls the sensory effect devices 714, 716, and 718 using the sensory effect metadata. Also, the sensory effect media consuming apparatus 712 synchronizes the media 708 with the sensory effect devices 714, 716, and 718.

Figure 8:
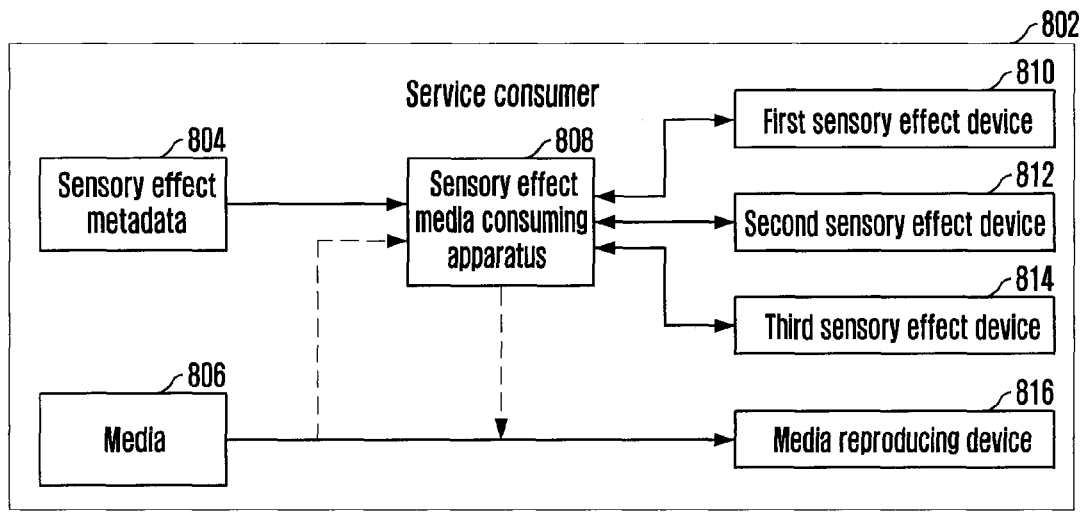
FIG. 8 is a block diagram illustrating an apparatus for generating and consuming sensory effect media in accordance with a third embodiment of the present invention.

FIG. 8 is a block diagram illustrating method and apparatus for generating and consuming sensory effect media in accordance with a third embodiment of the present invention. In FIG. 8, a service consumer side owns information for reproducing not only media but also sensory effects. Here, the service consumer side may include devices of a consumer, such as a DVD player. If the service consumer side is the DVD player, a disk stores information for reproducing the media and the sensory effects. The information for reproducing sensory effects may be stored in a form of metadata. The sensory effect metadata 804 is transmitted to the sensory effect media consuming apparatus 808 and controls the first to third sensory effect devices 810, 812, and 814. The sensory effect media consuming apparatus 808 may include a DVD player. The media 806 is reproduced by a media reproducing device 816 and outputted through a TV. For example, the DVD player may perform a function of the media reproducing device 816 together. The sensory effect media consuming apparatus 808 synchronizes the media 806 and the first to third sensory effect devices 810, 812, and 814.

Figure 9:
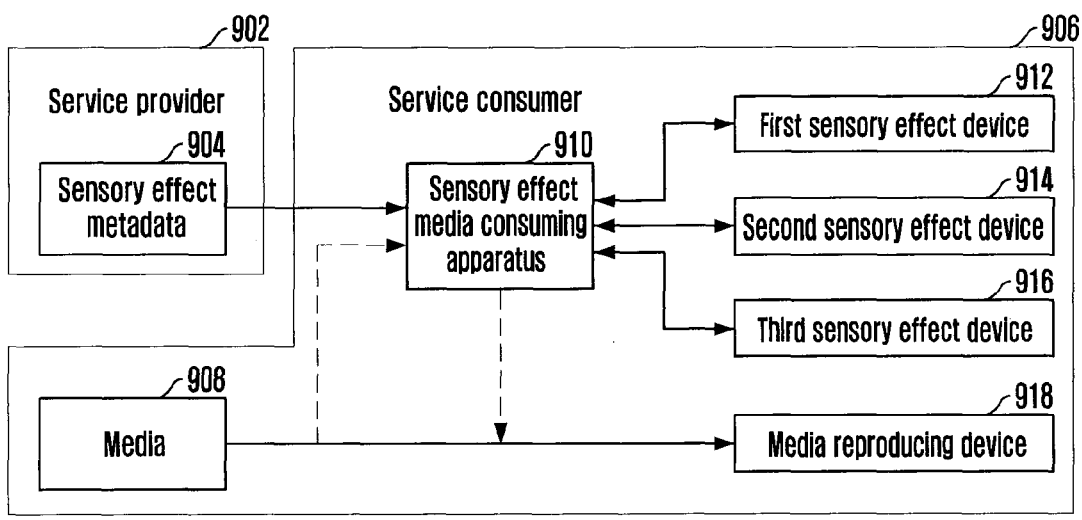
FIG. 9 is a block diagram illustrating an apparatus for generating and consuming sensory effect media in accordance with a fourth embodiment of the present invention.

FIG. 9 is a block diagram illustrating method and apparatus for generating and consuming sensory effect media in accordance with a fourth embodiment of the present invention. In FIG. 9, a service provider 902, equivalent to a sensory effect service provider in the third embodiment, provides information for reproducing sensory effects, and a service consumer 906 owns media 908 in the fourth embodiment. The service consumer 906 wants to reproduce sensory effects while reproducing the media 908. In order to reproduce the sensory effects, the service consumer 906 requests information for reproducing the sensory effects to the service provider 902. The service provider 902 transmits information for reproducing sensory effects to the service consumer 906. The information for reproducing sensory effects may be transmitted to the service consumer 906 in a form of sensory effect metadata. The service consumer 906 reproduces the media 908 using a media reproducing device 918, and the sensory effect media consuming apparatus 910 controls first to third sensory effect devices 912, 914, and 916 using the sensory effect metadata 904. The sensory effect media consuming apparatus 910 synchronizes the media 908 with the first to third sensory effect devices 912, 914, and 916.

Hereinafter, the sensory effect metadata according to an embodiment of the present invention will be described.

<Sensory Effect Metadata>

The sensory effect metadata according to the present embodiment include sensory effect information about sensory effects that are applied to media. To be specific, the sensory effect metadata according to the present embodiment includes effect description information for describing sensory effects and device control description information for controlling devices that perform sensory effects according to the effect description information. Herein, the sensory effect metadata may further include general information having sensory effect metadata generation information. A sensory effect media consuming apparatus including a user terminal can search for and control devices using the sensory effect metadata.

The effect description information may include effect type information about a type of sensory effect, identification information of a device, condition information of a device that performs sensory effect, and initial effect information of a device. The device control description information may include reference information for device identification information, synchronization information for synchronizing media and sensory effects, and parameter information for controlling devices.

Hereinafter, the sensory effect metadata according to embodiments of the present invention will be described with reference to FIGS. 10 to 18. The sensory effect metadata is referred to as device control information (DCI).

Meanwhile, the sensory effect metadata according to the present embodiment may be integrated with media such as MPEG-7 and a network technology such as LonWorks. For the Network technology such as LonWorks, standard network variable types (SNVTs) may be used. In this case, a namespace prefix may be used for identifying a type of metadata according to connected technology. Table 1 shows details of the namespace prefix.

TABLE 1

| Prefix | Corresponding namespace |
|---|---|
| dci | urn:dci:ver1:present:DeviceControlInformation:2007-05 |
| snvt | urn:SNVT:ver1:Represent:VariableList:2007:09 |
| Mpeg7 | urn:mpeg:mpeg7:schema:2001 |

Figure 10:
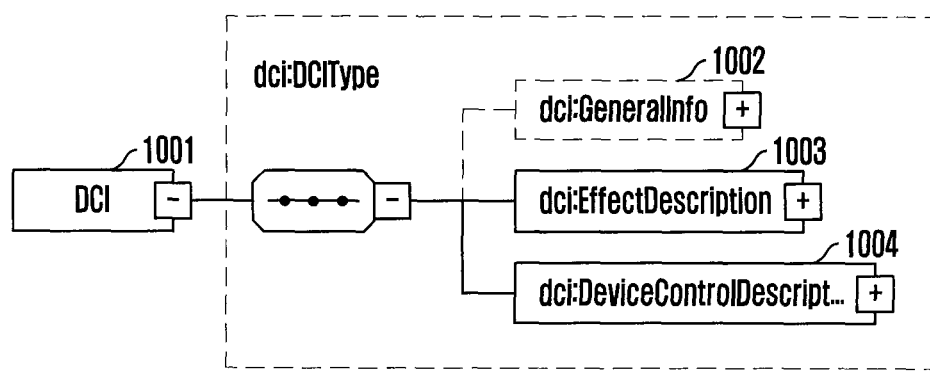
FIG. 10 describes device control information (DCI) in accordance with an embodiment of the present invention.

FIG. 10 describes device control information (DCI) in accordance with an embodiment of the present invention. Referring to FIG. 10, the device control information 1001 includes effect description information EffectDescription 1003 and device control description information DeviceControlDescription 1004. The device control information 1001 further includes general information GeneralInfo 1002. Table 2 shows details of the device control information.

TABLE 2

| Name | Definition |
|---|---|
| GeneralInfo | This element is the container for the information on the DCI creation |
| EffectDescription | This element is the container for the every effect applied to the media |
| DeviceControlDescription | This element is the container for the control parameters for each device |

The general information GeneralInfo 1002 includes information related to the generation of the device control information and the effect description information EffectDescription 1003 includes information related to effects that applied to media. The device control description information DeviceControlDescription 1004 may include information related to control parameters for each device.

For example, a schema for the device control information DCI 1001 related FIG. 10 is as follows.

```
<element name="DCI" type="dci:DCIType"/>
    <complexType name="DCIType">
        <sequence>
            <element name="GeneralInfo"
                type="mpeg7:DescriptionMetadataType"
                minOccurs="0"/>
            <element name="EffectDescription"
                type="dci:EffectDescriptionType"/>
            <element name="DeviceControlDescription"
                type="dci:DeviceControlDescriptionType"/
                >
        </sequence>
    </complexType>
```

Hereinafter, the general information GeneralInfo 1002, effect description information EffectDesription 1003, and the device control description information DeviceControl Description 1004 will be described.

Figure 11:
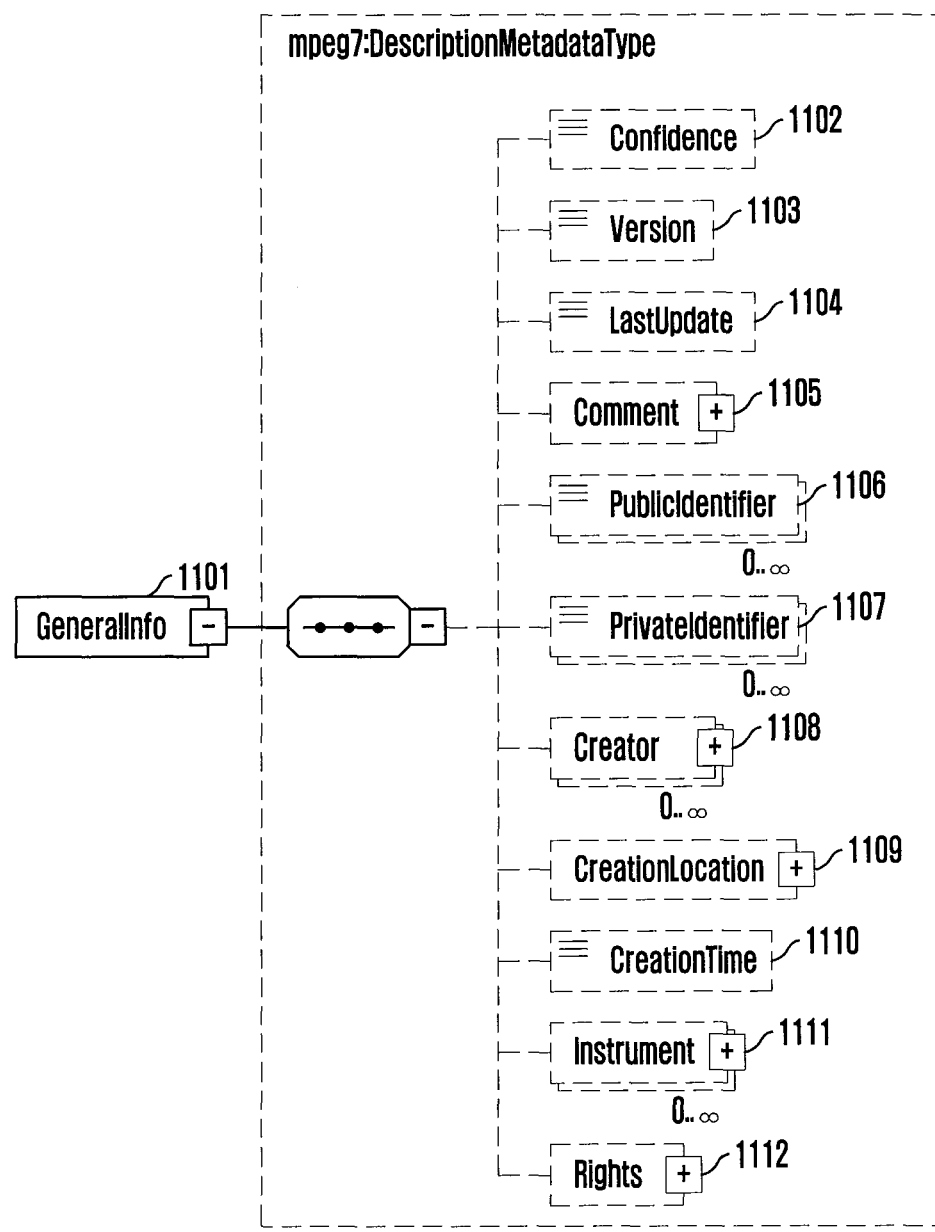
FIG. 11 describes general information (GeneralInfo) included in sensory effect metadata in accordance with an embodiment of the present invention.

FIG. 11 is a diagram for describing generation information GeneralInfo included in sensory effect metadata in accordance with an embodiment of the present invention. The general information GeneralInfo includes information related to the generation of the device control information. Referring to FIG. 11, the general information GeneralInfo 1102 may include Confidence 1102, Version 1103, Comment 1104, PublicIdentifier 1106, PrivateIdentifier 1107, Creator 1108, CreationLocation 1109, CreationTime 1110, Instrument 1111, and Rights 1112. The general information GeneralInfo 1102 includes information related to the generation of the device control information. Therefore, the general information may include information related to the generation of the general metadata. For example, the general information may include information about a version, a last update date, a producer, a producing time, a producing place, and a copyright. Here, "GeneralInfo" defined at MPEG-7 may be referred. An exemplary schema for the general information GeneralInfo 1102 is as follows.

```
<complexType name="DescriptionMetadataType">
    <complexContent>
        <extension base="mpeg7:HeaderType">
            <sequence>
                <element name="Confidence"
                    type="mpeg7:zeroToOneType"
                    minOccurs="0"/>
                <element name="Version"
                    type="string" minOccurs="0"/>
                <element name="LastUpdate"
                    type="mpeg7:timePointType"
                    minOccurs="0"/>
                <element name="Comment"
                    type="mpeg7:TextAnnotationType"
                    minOccurs="0"/>
                <element name="PublicIdentifier"
                    type="mpeg7:UniqueIDType"
                    minOccurs="0"
                    maxOccurs="unbounded"/>
                <element name="PrivateIdentifier"
                    type="string" minOccurs="0"
                    maxOccurs="unbounded"/>
                <element name="Creator"
                    type="mpeg7:CreatorType"
                    minOccurs="0"
                    maxOccurs="unbounded"/>
                <element name="CreationLocation"
                    type="mpeg7:PlaceType"
                    minOccurs="0"/>
                <element name="CreationTime"
                    type="mpeg7:timePointType"
                    minOccurs="0"/>
                <element name="Instrument"
                    type="mpeg7:CreationToolType"
                    minOccurs="0"
                    maxOccurs="unbounded"/>
                <element name="Rights"
                    type="mpeg7:RightsType"
                    minOccurs="0"/>
            </sequence>
        </extension>
    </complexContent>
</complexType>
```

Hereinafter, the effect description information EffectDescription will be described.

Figure 12:
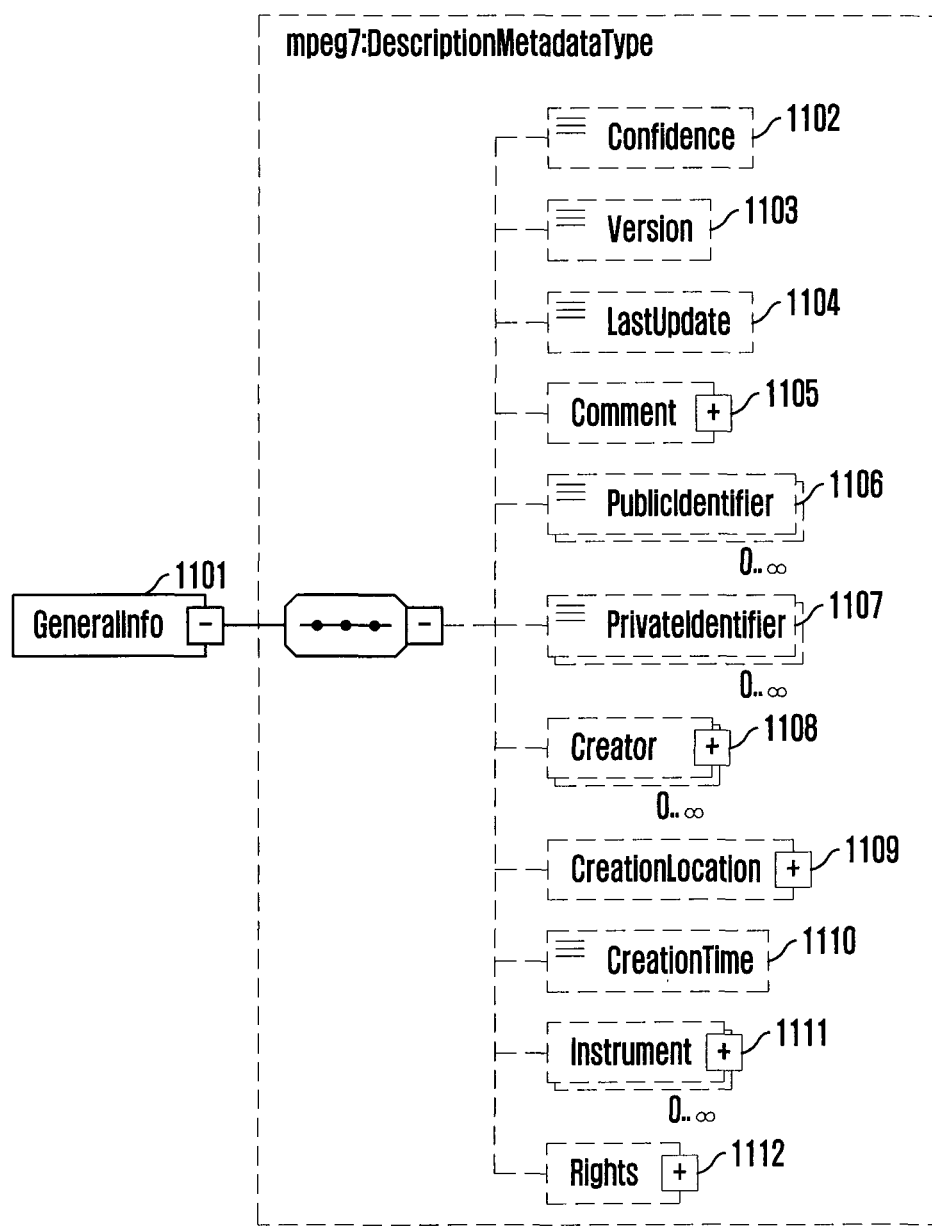
FIG. 12 describe effect description information (EffectDescription) included in sensory effect metadata in accordance with an embodiment of the present invention.

FIG. 12 describes effect description information EffectDescription included in sensory effect metadata in accordance with an embodiment of the present invention. The effect description information EffectDescription may include information about all of effects that are applied to media. The sensory effect media consuming apparatus including a user terminal determines what type of effect is applied to media and maps devices for each of the effects based on transferred information. Referring to FIG. 12, the effect description information EffectDescription 1201 may include effect information Effect 1202. The effect information Effect 1202 may include a plurality of information. Table 3 shows the definition of the effect information.

TABLE 3

| Name | Definition |
|---|---|
| Effect | This element describes the information of an effect |

The effect information Effect 1202 describes sensory effects. An exemplary schema for the effect description information EffectDescription 1202 related to FIG. 12 is as flows.

```
<element name="EffectDescription"
    type="dci:EffectDescriptionType"/>
    <complexType name="EffectDescriptionType">
        <sequence>
            <element name="Effect"
                type="dci:EffectType"
                maxOccurs="unbounded"/>
        </sequence>
    </complexType>
```

Hereinafter, the effect information Effect will be described.

Figure 13:
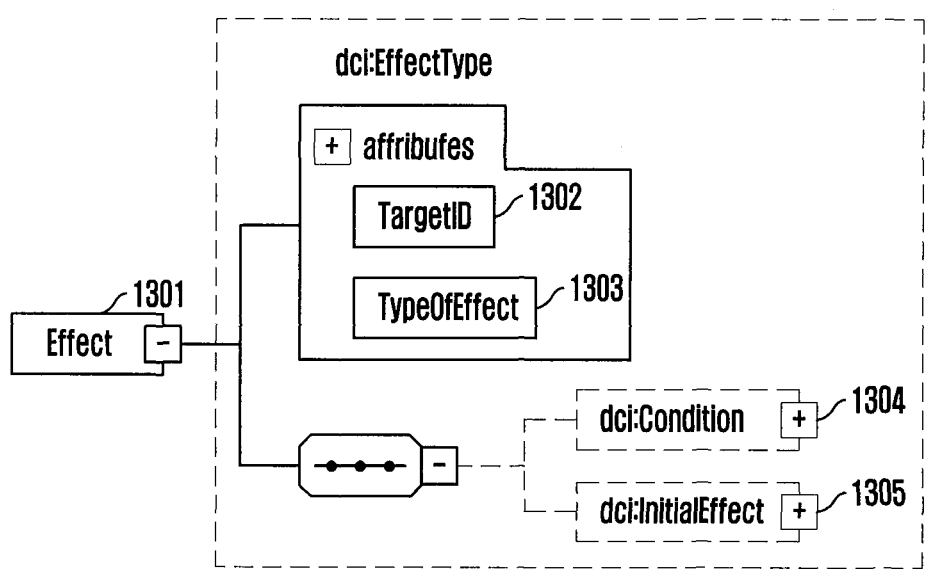
FIG. 13 describes effect information included in sensory effect metadata in accordance with an embodiment of the present invention.

FIG. 13 describes effect information included in sensory effect metadata in accordance with an embodiment of the present invention. The effect information Effect may include sensor effect type information, device condition information, and initial effect information. The effect information Effect functions as connecting devices with sensory effects. Referring to FIG. 13, the effect information Effect 1301 may include device identification information TargetID 1302, effect type information TypeOfEffect 1303, condition information Condition 1304, and initial effect information InitialEffect 1305.

Table 4 shows details of the effect information.

TABLE 4

| Name | Definition |
|---|---|
| TypeOfEffect | This attribute contains the enumeration set of effect type. |
| | Enumeration Value — Description |
| | "VisualEffect" — Visual effect |
| | "SoundEffect" — Sound effect |
| | "WindEffect' — Wind effect |
| | "TemperatureEffect" — Temperature effect |
| | "LightEffect' — Light effect |
| | "ShadingEffect" — Shading effect |
| | "VibrationEffect" — Vibration effect |
| | "ScentEffect" — Scent effect |
| TargetID | This attribute describes the ID of individual device that will present the effect. It is necessary in case the author wants to give an effect with multiple devices. |
| Condition | This element describes the conditions information for the devices |
| InitialEffect | This element contains the device control parameters for initial effect |

The device identification information TargetID 1302 is information that describes the identifications of individual devices that perform the sensory effects. The device identification information TargetID 1302 is used to identify devices if sensory effects are reproduced using a plurality of devices. The effect type information TypeOfEffect 1303 may include enumeration for effect types of sensory effects. Table 4 shows the enumeration for effect types included in the effect type information TypeOfEffect 1303.

As shown in Table 4, the enumeration may include visual effect VisualEffect, sound effect SoundEffect, wind effect WindEffect, temperature effect TemperatureEffect, light effect LightEffect, shading effect ShadingEffect, vibrating effect VibrationEffect, and scent effect ScentEffect. An exemplary schema for the effect information 1301 related to FIG. 13 is as follows.

```
<element name="Effect" type="dci:EffectType"/>
    <complexType name="EffectType">
        <sequence>
            <element name="Condition"
                type="dci:ConditionType" minOccurs="0"/>
            <element name="InitialEffect"
                type="dci:ControlDataType"
                minOccurs="0"/>
        </sequence>
        <attribute name="TargetID" type="ID"
use="required"/>
        <attribute name="TypeOfEffect" use="required">
            <simpleType>
                <restriction base="string">
                    <enumeration
                        value="VisualEffect"/>
                    <enumeration value="SoundEffect"/>
                    <enumeration value="WindEffect"/>
                    <enumeration
                        value="TemperatureEffect"/>
                    <enumeration
                        value="LightingEffect"/>
                    <enumeration
                        value="ShieldingEffect"/>
                    <enumeration
                        value="VibrationEffect"/>
                    <enumeration value="ScentEffect"/>
                    <enumeration value="OtherEffect"/>
                </restriction>
            </simpleType>
        </attribute>
    </complexType>
```

Hereinafter, the condition information Condition will be described.

Figure 14:
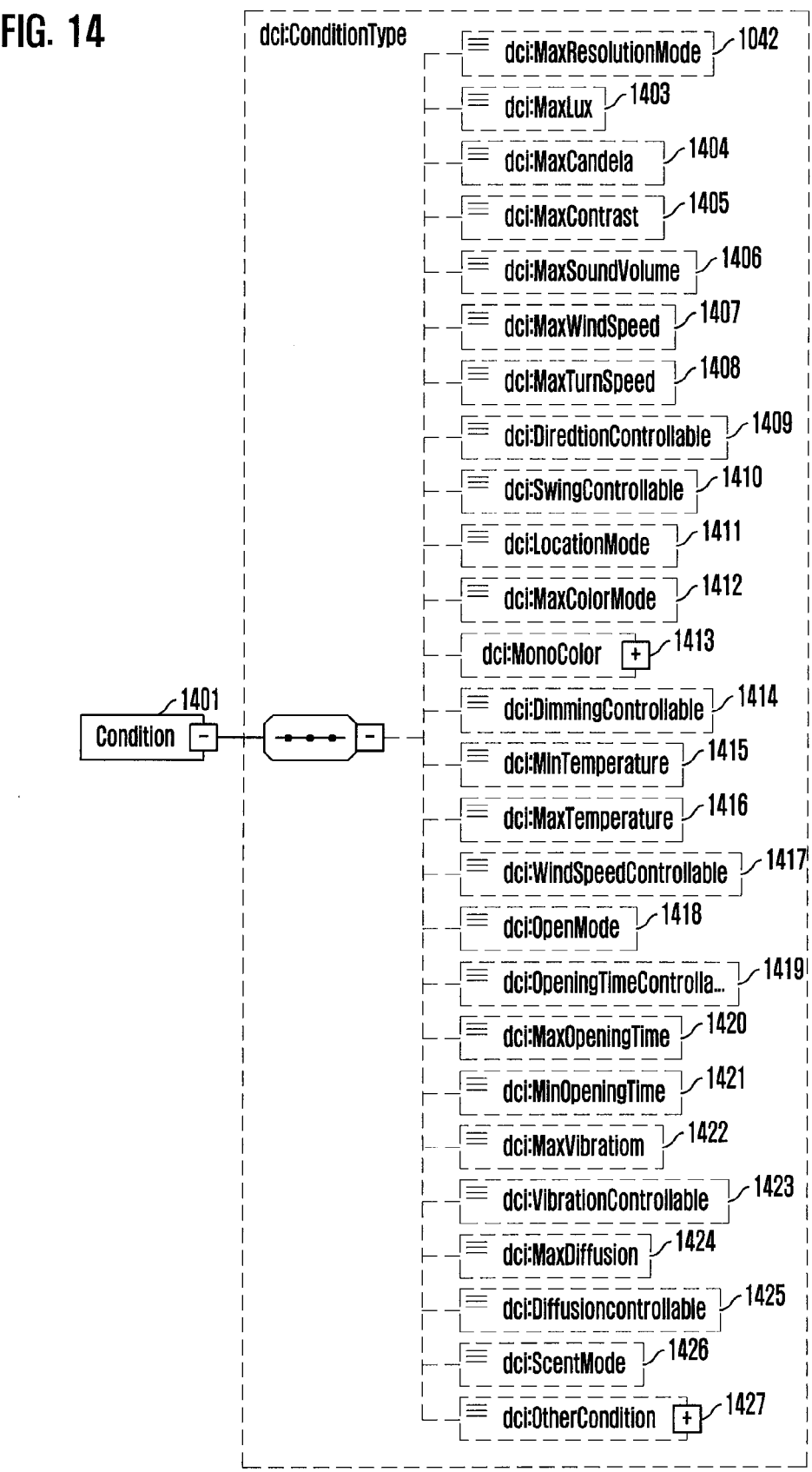
FIG. 14 describes condition information included in sensory effect metadata in accordance with an embodiment of the present invention.

FIG. 14 describes condition information included in sensory effect metadata in accordance with an embodiment of the present invention. The condition information Condition may include information about details that devices need to perform sensory effects. For example, the condition information Condition may provide hint information to a sensory effect consuming apparatus including a user terminal for mapping the most suitable devices to corresponding sensory effects among devices that a user owns. The condition information Condition may include information about what parameters are used for controlling devices. For example, if the condition information Condition includes information for controlling a direction of a device, a control parameter for setting a direction is used. Meanwhile, the condition information may set a control value within an operation range in order to stably control devices. It is because an extreme control value, which is set regardless of a device property, may damage the device or harm a user.

Referring to FIG. 14, the condition information Condition 1401 includes MaxResolutionMode 1402, MaxLux 1403, MaxCandela 1404, MaxContrast 1405, MaxSoundVolume 1406, MaxWindSpeed 1407, MaxTurnSpeed 1408, DirectionControllable 1409, SwingControllable 1410, LocationMode 1411, MaxColorMode 1412, MonoColor 1413, DimmingControllable 1414, MinTemperature 1415, MaxTemperature 1416, WindSpeedControllable 1417, OpenMode 1418, OpeningTimeControllable 1419, MaxOpeningTime 1420, MinOpeningTime 1421, MaxVibration 1422, VibrationControllable 1423, MaxDiffusion 1424, DiffusionControllable 1425, ScentMode 1426, and OtherCondition 1427. Tables 5 and 6 show the details of condition information.

TABLE 5

| Name | Definition |
| --- | --- |
| MaxResolution Mode | This element describes the max resolution mode that the visual effect device should support. |
| MaxLux | This element describes the maximum brightness value by lux (lx) that the lighting effect device should support. The type is dci:LuxType. |
| MaxCandela | This element describes the maximum candela (cd) value that the visual effect device should support. Candela is the S1 base unit of luminous intensity. It is used by visual devices such as monitor, PDP TV, LCD TV. The type is dci:CandelaType. |
| MaxContrast | This element describes the maximum contrast that the visual effect device should support. This type is dci:ContrastType. |
| MaxSoundVolume | This element describes the maximum sound volume by decibel (db) that the sound device should support. The type is dci:soundVolumetype. |
| MaxWindSpeed | This element describes the maximum wind speed value by meter per second (mps) that the wind effect device should support. The type is dci:WindSpeedType. |
| MaxTurnSpeed | This element describes the maximum value for turning speed that the device should support. This will be used in such device as rotation fan device or rotation lighting device. The type is dci:TrunSpeedType. |
| Directioncontrollable | This element indicates the controllability for direction. If the value is true, the device should support the direction controllability. If false, the device may not support it. |
| SwingControllable | This element indicates the controllability for swing. If the value is true, the device should support the swing controllability. If false, the device may not support it. |
| LocationMode | This element describes the mode of location |
| MaxColorMode | This element describes the maximum number of colors that the device should support. This is necessary in case the device can change color |

TABLE 6

| Name | Definition |
| --- | --- |
| MonoColor | This element describes a mono color that the device should support. This is necessary in case the device cannot change its color. The type is dci:ColorType as follows. The color can be expressed by r, g, b intensity. |
| DimmingControllable | This element indicates the controllability for dimming. If the value is true, the device should support dimming controllability. If false, the device shall not support it |
| MinTemperature | This element describes the minimum value of temperature by Celsius that the device should support. The type is dci:MinTempType. |
| MaxTemperature | This element describes the maximum value of temperature by Celsius that the device should support. The type is dci:MaxTempType. |
| WindSpeedControllable | This element indicates the controllability for wind speed. If the value is true, the device should support wind speed controllability. If false, the device shall not support it |
| OpenMode | This element describes the open mode that the shading device should support. |
| MaxVibration | This element describes the maximum value of vibration by rpm that the vibration device should support. The type is dci:VibrationType. |
| VibraionControllable | This elemenet indicates the controllability for vibration. If the value is true, the device should support vibration controllability. If false, the device should not support it |
| MaxDiffusion | This element describes the maximum value of diffusion by milligram (mil) that the diffusion device should support. The type is dci:DiffusionType. |
| DiffusionControllable | This elemenet indicates the controllability for diffusion. If the value is true, the device should support diffusion controllability. If false, the device should not support it |
| ScentMode | This element describes the mode of scent that the scent device should support. |
| OtherCondition | This element reserves a hole for extension |

MaxResolutionMode 1402 describes the maximum resolution mode that a visual effect device should supports. Table 7 shows details of resolution modes.

TABLE 7

| Resolution Modes | Description | Remark |
| --- | --- | --- |
| 1 | 1024 * 768 | General vision |
| 2 | 1280 * 1024 | General vision |
| 3 | 1400 * 1050 | General vision |
| 4 | 1600 * 1200 | General vision |
| 5~32 | reserved | General vision |
| 33 | 1280 * 768 | Wide vision |
| 34 | 1366 * 768 | Wide vision |
| 35 | 1440 * 900 | Wide vision |
| 36 | 1440 * 990 | Wide vision |
| 37 | 1440 * 1050 | Wide vision |
| 38 | 1680 * 1050 | Wide vision |
| 39 | 1920 * 1080 | Wide vision |
| 40 | 1920 * 1200 | Wide vision |
| 41~64 | reserved | Wide vision |

MaxLux 1403 describes the maximum brightness value by lux (lx) that the lighting effect device should support. MaxCandela 1404 describes the maximum luminance in a unit of candela cd that a visual effect device should support. The candela is a SI unit for luminance intensity. It is used for a visual effect device such as a monitor, a PDP TV, and a LCD TV. MaxContrast 1405 describes the maximum contrast that a visual effect device should support. MaxSoundVolume 1406 describes the maximum sound volume in a unit of decibel db, which a sound effect device should support.

MaxWindSpeed 1407 describes the maximum wind speed in a unit of meter per second m/s that a wind effect device should support. MaxTurnSpeed 1408 describes the maximum value of a turning speed that a device should support. It may be used for a rotation fan device or a rotation lighting device.

DirectionControllable 1409 indicates controllability for a direction. If DirectionControllable 1409 is true, a corresponding device should support the direction controllability. If DirectionControllable 1409 is false, a corresponding device should not support it.

SwingControllable 1410 indicates controllability for swing. If the value thereof is true, a corresponding device should support the swing controllability. If the value is false, the corresponding device should not support it.

LocationMode 1411 describes a mode for a location. Table 8 defines details of LocationMode.

TABLE 8

| Location Modes | Description |
| --- | --- |
| 1 | Front |
| 2 | Rear |
| 3 | Left |
| 4 | Right |
| 5 | Left Front |
| 6 | Right Front |
| 7 | Left Rear |
| 8 | Right Rear |

MaxColorMode 1412 describes the maximum number of colors that a device should support. It is necessary if the device can change colors. Table 9 defines modes for colors.

TABLE 9

| Color Modes | Description |
| --- | --- |
| 1 | 1 bit colors |
| 2 | 2 bits colors |
| 3 | 4 bits colors |
| 4 | 8 bits colors |
| 5 | 16 bits color |
| 6 | 32 bits color |
| 7~15 | reserved |

MonoColor 1413 describes a mono colors that a device should support. MonoColor 1413 is necessary if a device cannot change colors. Color may be expressed as R, G, and B intensity.

DimmingControllable 1414 indicates controllability for dimming. If DimmingControllable 1414 is true, a corresponding device should support dimming controllability. If DimmingControllable 1414 is false, a corresponding device should not support dimming controllability.

MinTemperature 1415 describes the minimum temperature value in Celsius that a device should support. MaxTemperature 1416 describes the maximum temperature value in Celsius that a device should support.

WindSpeedControllable 1417 indicates controllability for a wind speed. If WindSpeedControllable 1417 is true, a corresponding device should support wind speed controllability. If WindSpeedControllable 1417 is false, a corresponding device should not support wind speed controllability. OpenMode 1418 describes an open mode that a shading device should support. Table 10 shows details of the open modes.

TABLE 10

| Value of Open Mode | Open Mode |
| --- | --- |
| 1 | Bottom to Top |
| 2 | Top to Bottom |
| 3 | Left to Right |
| 4 | Right to Left |
| 5 | Center to Side |

Information related to OpenMode 1418 includes OpeningTimeControllable 1419, MaxOpeningTime 1420, and MinOpeningTime 1421.

MaxVibration 1422 describes the maximum vibration value in rpm that a vibration effect device should support. VibrationControllable 1423 indicates controllability for vibrating. If VibrationControllable 1423 is true, a corresponding device should support vibration controllability for vibrating. If VibrationControllable 1423 is false, a corresponding device should not support vibration controllability. MaxDiffusion 1424 describes the maximum diffusion value of a diffusion effect device in milligram. DiffusionControllable 1425 indicates controllability for diffusion. If DiffusionControllable 1425 is true, a corresponding device should support diffusion controllability. If DiffusionControllable 1425 is false, the corresponding device should not support diffusion controllability.

ScentMode 1426 describes scent modes that a scent effect device should support. Table 11 shows details of scent modes.

TABLE 11

| Scent Mode | Description |
| --- | --- |
| 1 | Scent of rose |
| 2 | Scent of acacia |
| 3 | Scent of chrysanthemum |
| 4 | Scent of lilac |
| 5 | Scent of mint |
| 6 | Scent of jasmine |
| 7 | Scent of pine tree |
| 8 | Scent of orange |
| 9 | Scent of grape |
| 10~1024 | reserved |

OtherCondition 1427 is an element reserved for extensibility of the condition information Condition 1401.

An exemplary schema of the condition information Condition 1401 is as follows.

```
<element name="Condition" type="dci:ConditionType"/>
    <complexType name="ConditionType">
        <sequence>
            <element name="MaxResolutionMode"
                type="unsignedInt" minOccurs="0"/>
            <element name="MaxLux"
                type="dci:LuxType" minOccurs="0"/>
            <element name="MaxCandela"
                type="dci:CandelaType" minOccurs="0"/>
            <element name="MaxContrast"
                type="dci:ContrastType" minOccurs="0"/>
            <element name="MaxSoundVolume"
                type="dci:SoundVolumeType"
                minOccurs="0"/>
            <element name="MaxWindSpeed"
                type="dci:WindSpeedType" minOccurs="0"/>
            <element name="MaxTurnSpeed"
                type="dci:TurnSpeedType" minOccurs="0"/>
            <element name="DirectionControllable"
                type="boolean" minOccurs="0"/>
            <element name="SwingControllable"
                type="boolean" minOccurs="0"/>
            <element name="LocationMode"
                type="unsignedInt" minOccurs="0"/>
            <element name="MaxColorMode"
                type="unsignedInt" minOccurs="0"/>
            <element name="MonoColor"
                type="dci:ColorType" minOccurs="0"/>
            <element name="DimmingControllable"
                type="boolean" minOccurs="0"/>
            <element name="MinTemperature"
                type="dci:MinTemperatureType"minOccurs="0"/>
            <element
                name="MaxTemperature"type="dci:MaxTemperatureType"minOccurs="0"/>
            <element name="WindSpeedControllable"
                type="boolean" minOccurs="0"/>
            <element name="OpenMode"
                type="unsignedInt" minOccurs="0"/>
            <element name="MaxVibration"
                type="dci:VibrationType" minOccurs="0"/>
            <element name="VibrationControllable"
                type="boolean" minOccurs="0"/>
            <element name="MaxDiffusion"
                type="dci:DiffusionType" minOccurs="0"/>
            <element name="DiffusionControllable"
                type="boolean" minOccurs="0"/>
            <element name="ScentMode"
                type="unsignedInt" minOccurs="0"/>
            <element name="OtherCondition"
                type="dci:OtherType" minOccurs="0"/>
        </sequence>
    </complexType>
```

Hereinafter, the initial effect information InitialEffect will be described in more detail.

Figure 15:
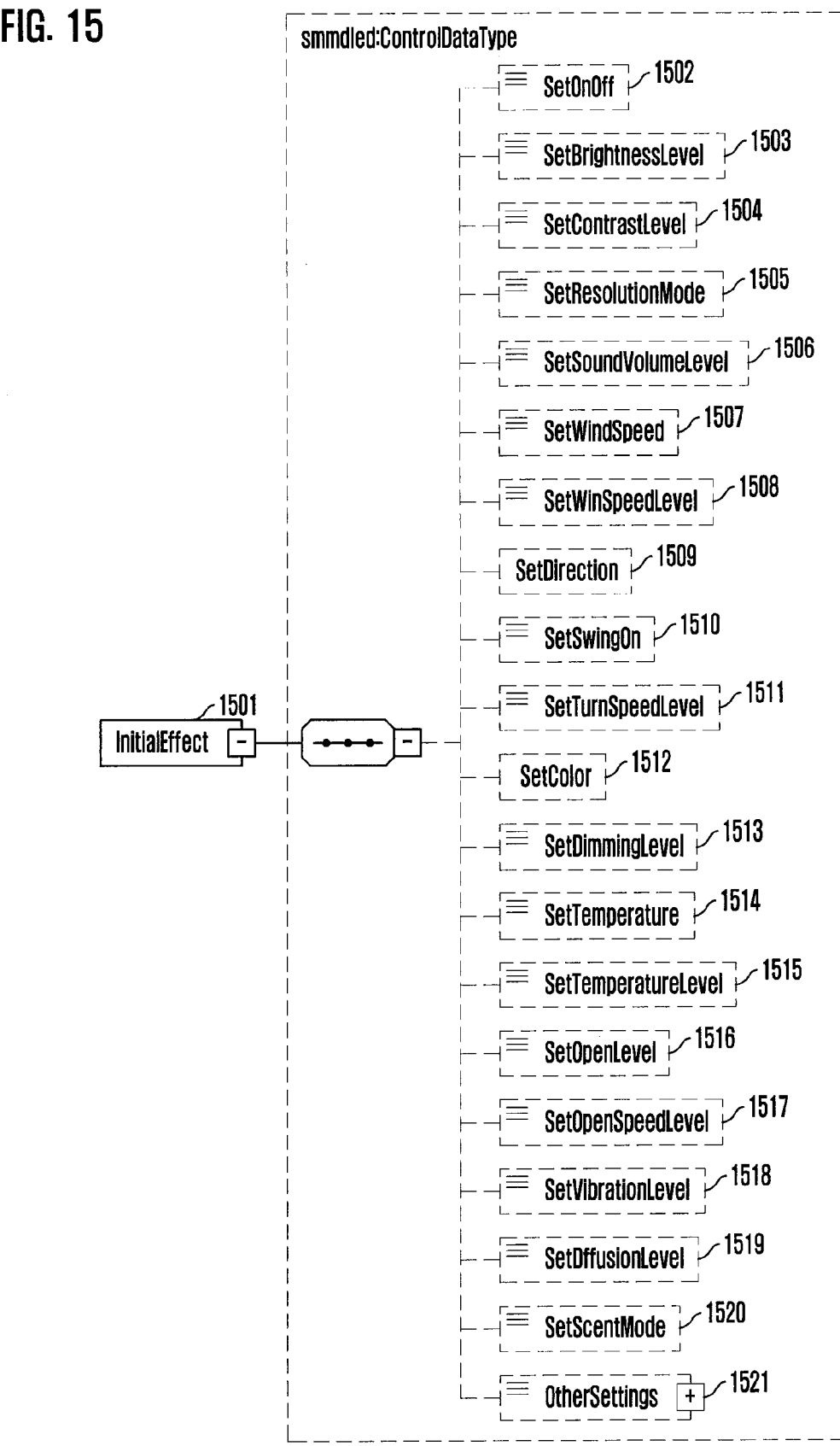
FIG. 15 describes initial effect information included in sensory effect metadata in accordance with an embodiment of the present invention.

FIG. 15 is a diagram for describing initial effect information included in sensory effect metadata in accordance with an embodiment of the present invention. The initial effect information InitialEffect includes information about initial states before sensory effect media is consumed. The initial effect information InitialEffect may include a list for device control parameters.

Referring FIG. 15, the initial effect information InitialEffect 1501 includes SetOnOff 1502, SetBrightnessLevel 1503, SetContrastLevel 1504, SetResolutionMode 1505, SetSoundVolumeLevel 1506, SetWindSpeed 1507, SetWindSpeedLevel 1508, SetDirection 1509, SetSwingOn 1510, SetTurnSpeedLevel 1511, SetColor 1512, SetDimmingLevel 1513, SetTemperature 1514, SetTemperatureLevel 1515, SetOpenLevel 1516, SetOpenSpeedLevel 1517, SetVibrationLevel 1518, SetDiffusionLevel 1519, SetScentMode 1520, and OtherSettings 1521. Table 12 shows definitions of elements of the initial effect information.

TABLE 12

| Name | Definition |
|---|---|
| SetOnOff | This element sets state of device into on or off. The type is boolean. |
| SetBrightnessLevel | This element sets brightness level of visual device. The value is expressed in percentage (0%~100%). The type is dci:LevelType. |
| SetContrastLevel | This element sets contrast level of visual device. The value is expressed in percentage (0%~100%). The type is dci:LevelType |
| SetResolutionMode | This element sets resolution mode of visual device. The resolution mode is defined as table in Annex A. 1. |
| SetSoundVolumeLevel | This element sets volume level of sound device. The value is expressed in percentage (0%~100%). The type is dci:LevelType. |
| SetWindSpeed | This element sets wind speed of wind device. The value is expressed in Meter per Second (mps). The type is dci:WindSpeedType |
| SetWindSpeed Level | This element sets wind speed level of wind device. The value is expressed in percentage (0%~100%). The type is dci:LevelType |
| SetDirection | This element sets direction of the device. The type is dci:DirectionType. dci:DirectionType has two attributes, xAngle and yAngle, to express the direction. xAngle and yAngle attributes are represented by snvt:angle_degType. |
| SetTurnSpeed Level | This element sets turning speed level of the device. The value is expressed in percentage (0%~100%). The type is dci:LevelType. |
| SetColor | This element sets color of lighting device which enables to represent certain color. The type of SetColor is dci:ColorType. |
| SetDimmingLevel | This element sets dimming level of lighting device which enable to dim the brightness level. The type is dci:LevelType. |
| SetTemperature | This element sets temperature of temperature control device. The type is dci:TemperatureType. |
| SetTemperatureLevel | This element sets temperature level of temperature control device. The type is dci:LevelType. |
| SetOpenLevel | This element sets open level of shading device, the type is dci:LevelType. |
| SetVibration Level | This element sets vibration level of vibration device. The type is dci:LevelType. |
| SetDiffusion Level | This element sets diffusion level of diffusion device. The type is dci:LevelType. |
| SetScentMode | This element sets a scent mode for scent device. |
| OtherSettings | This element sets other control data for effects. This element is for user defined control data. The type of OtherSettings is dci:OtherType. |

SetOnOff 1502 sets a state of a device into on or off.

SetBrightnessLevel 1503 sets a brightness level of a visual effect device. The value thereof is expressed in percentage. SetContrastLevel 1504 sets a contrast level of a visual effect device. The value thereof is expressed in percentage.

SetResolutionMode 1505 sets a resolution mode of a visual effect mode. SetSoundVolumeLevel 1506 sets a volume level of a sound effect device. The value thereof is expressed in percentage.

SetWindSpeed 1507 sets a wind speed of a wind effect device. The value thereof is expressed in a unit of meter per second m/s. SetWindSpeedLevel 1508 sets a wind speed level of a wind effect device. The value thereof is expressed in percentage.

SetDirection 1509 sets a direction of a device. SetDirection 1509 has two attributes, x-angle and y-angle, which will be described in later with SNVTs. SetTurnSpeedLevel 1511 describes a turning speed of a device. The value thereof is expressed in percentage.

SetColor 1512 sets a color of a light effect device that emits a predetermined color of light. SetDimmingLevel 1513 sets a dimming level of a lighting device that dims the brightness level. SetTemperature 1514 sets a temperature of a temperature control device. SetTemperatureLevel 1515 sets a temperature level of a temperature control device. SetOpenLevel 1516 sets an open level of a shading device. Related to SetOpenLevel 1516, SetOpenSpeedLevel 1517 may be further set.

SetVibrationLevel 1518 sets a vibration level of a vibrating device. SetDiffusionLevel 1519 sets a diffusion level of a diffusion device. SetScentMode 1520 sets a scent mode of a scent effect device.

OtherSettings 1521 sets control data for controlling other sensory effects. OtherSettings 1521 may be defined for elements defined in the condition information Condition. In addition, OtherSettings 1521 may be defined for elements in SetSwingOn 1510.

An exemplary schema for the initial effect information InitialEffect 1501 is as follows.

```
<element name="InitialEffect" type="dci:ControlDataType"/>
    <complexType name="ControlDataType">
        <sequence>
            <element name="SetOnOff" type="boolean"
            minOccurs="0"/>
            <element name="SetBrightnessLevel"
            type="dci:LevelType" minOccurs="0"/>
            <element name="SetContrastLevel"
            type="dci:LevelType" minOccurs="0"/>
            <element name="SetResolutionMode"
            type="unsignedInt" minOccurs="0"/>
            <element name="SetSoundVolumeLevel"
            type="dci:LevelType" minOccurs="0"/>
            <element name="SetWindSpeed"
            type="dci:WindSpeedType" minOccurs="0"/>
            <element name="SetWindSpeedLevel"
            type="dci:LevelType" minOccurs="0"/>
            <element name="SetDirection"
            type="dci:DirectionType" minOccurs="0"/>
            <element name="SetSwingOn"
            type="unsignedInt" minOccurs="0"/>
            <element name="SetTurnSpeedLevel"
            type="dci:LevelType" minOccurs="0"/>
            <element name="SetColor"
            type="dci:ColorType" minOccurs="0"/>
            <element name="SetDimmingLevel"
            type="dci:LevelType" minOccurs="0"/>
            <element name="SetTemperature"
            type="dci:TemperatureType"
            minOccurs="0"/>
            <element name="SetTemperatureLevel"
```

```
            type="dci:LevelType" minOccurs="0"/>
        <element name="SetOpenLevel"
            type="dci:LevelType" minOccurs="0"/>
        <element name="SetOpenSpeedLevel"
            type="dci:LevelType" minOccurs="0"/>
        <element name="SetVibrationLevel"
            type="dci:LevelType" minOccurs="0"/>
        <element name="SetDiffusionLevel"
            type="dci:LevelType" minOccurs="0"/>
        <element name="SetScentMode"
            type="unsignedInt" minOccurs="0"/>
        <element name="OtherSettings"
            type="dci:OtherType" minOccurs="0"/>
    </sequence>
</complexType>
```

Hereinafter, the device control description information DeviceControlDescription will be described in detail.

Figure 16:
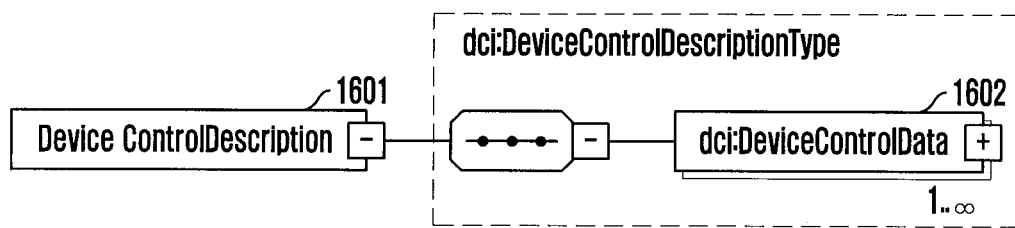
FIG. 16 describes device control description information included in sensory effect metadata in accordance with an embodiment of the present invention.

FIG. 16 is a diagram for describing device control description information included in sensory effect metadata in accordance with an embodiment of the present invention. Referring to FIG. 16, the device control description information DeviceControlDescription 1601 may include device control data DeviceControlData 1602. The device control description information DeviceControlDescription 1601 may include a plurality of device control data DeviceControlData 1602 according to the number of sensory effect devices. Table 13 shows details of device control description information.

TABLE 13

| Name | Definition |
| --- | --- |
| DeviceControlData | This element describes device control data for each device |

The device control data DeviceControlData 1602 may include control data of each device. An exemplary schema for the describe control description information 1601 is as follows.

```
<element name="DeviceControlDescription"
    type="dci:DeviceControlDescriptionType"/>
    <complexType name="DeviceControlDescriptionType">
        <sequence>
            <element name="DeviceControlData"
                type="dci:DeviceControlDataType"
                maxOccurs="unbounded"/>
        </sequence>
    </complexType>
```

Hereinafter, the device control data DeviceControlData will be described.

Figure 17:
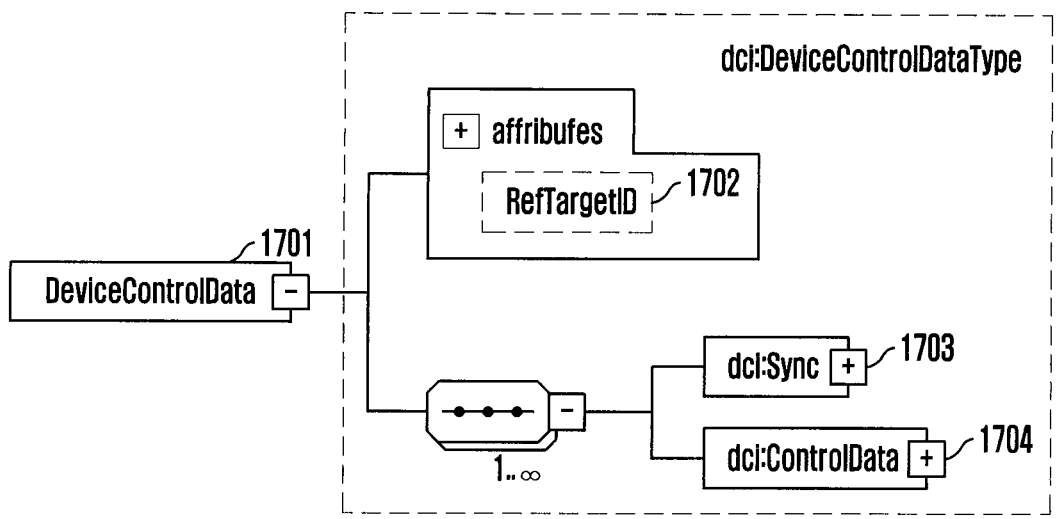
FIG. 17 describes device control data included in sensory effect metadata in accordance with an embodiment of the present invention.

FIG. 17 is a diagram for describing device control data included in sensory effect metadata in accordance with an embodiment of the present invention. Referring to FIG. 17, the device control data DeviceControlData 1701 includes reference information RefTargetID 1702 about device identification information, synchronization information Sync 1703 for synchronizing media and sensory effects, and parameter information ControlData 1704 for controlling a device. The device control data DeviceControlData 1701 may include control information of each device. The device control data DeviceControlData 1701 may be matched with effect information Effect included in the effect description information with reference to the device identification information TargetID. The device control data DeviceControlData 1701 includes synchronization information Sync 1703 for interlocking with media. Table 14 shows the details of the elements of the device control data.

TABLE 14

| Name | Definition |
| --- | --- |
| RefTargetID | This element points to TargetID of Effect in EffectDescription. Through this element, the terminal can recognize this control data is belongs to which device. |
| Sync | This element describes time information for synchronization with media. The type is dci:SyncType as follows. dci:syncType has two attributes, start and duration. These attributes are represented by mpeg7:mediaTimePointType and mpeg7:mediaDrationType. |
| ControlData | This element describes various control parameters for device. The type is dci:ControlDataType which is explained in InitialEffect in EffectDescription. |

The reference information RefTargetID 1702 indicates effect information Effect included in the effect description information EffectDescription. The sensory effect media consuming apparatus including a user terminal uses the reference information RefTargetID 1702 to determine which device is related to control data.

The synchronization information Sync 1703 describes time information for synchronizing with media. The synchronization information Sync 1703 may include attributes such as start and duration.

The parameter information ControlData 1704 describes various control parameters for a device.

Figure 18:
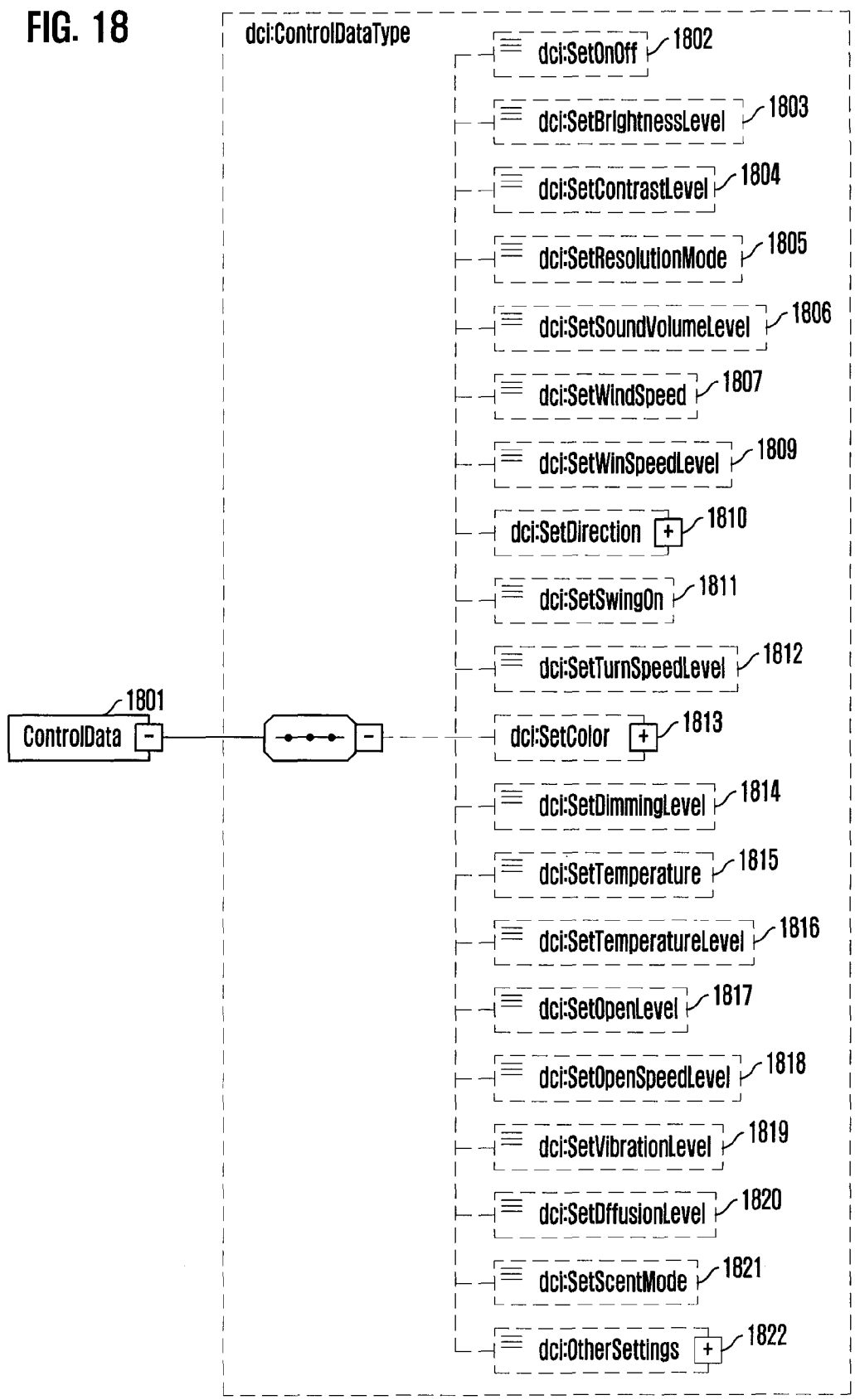
FIG. 18 describes parameter information ControlData included in sensory effect metadata in accordance with an embodiment of the present invention.

FIG. 18 is a diagram for describing parameter information ControlData included in sensory effect metadata in accordance with an embodiment of the present invention. Referring to FIG. 18, the parameter information ControlData 1801 includes SetOnOff 1802, SetBrightnessLevel 1803, SetContrastLevel 1804, SetResolutionMode 1805, SetSoundVolumeLevel 1806, SetWindSpeed 1807, SetWindSpeedLevel 1808, SetDirection 1809, SetSwingOn 1810, SetTurnSpeedLevel 1811, SetColor 1812, SetDimmingLevel 1813, SetTemperature 1814, SetTemperatureLevel 1815, SetOpenLevel 1816, SetOpenSpeedLevel 1817, SetVibrationLevel 1818, SetDiffusionLevel 1819, SetScentMode 1820, and OtherSettings 1821. The parameter information ControlData 1704 is related the initial effect information InitialEffect included in the effect description information EffectDescription. The detail description thereof is omitted.

Tables 15 to 17 are for describing a simple type. The simply type may include restriction condition information for sensory effects.

TABLE 15

| Name | Definition & Source |
| --- | --- |
| LuxType | This simple type represents degree of brightness using lux. The restriction base is snvt:luxType. The value is restricted from 0 to 5000 lux.<br><simpleType name="LuxType"><br>  <restriction base="snvt:luxType"><br>    <maxInclusive value="5000"/><br>  </restriction><br></simpleType> |
| CandelaType | This simple type represents intensity of light using candela. The value is restricted from 0 to 5000.<br><simpleType name="CandelaType"><br>  <restriction base="unsignedInt"><br>    <minInclusive value="0"/><br>    <maxInclusive value="5000"/><br>  </restriction><br></simpleType> |
| MaxTemperatureType | This simple type represents maximum temperature using centigrade. The restriction base is snvt:temp_pType. The value is restricted from 0 to 45.<br><simpleType name="MaxTemperatureType"><br>  <restriction base="snvt:temp_pType"><br>    <minInclusive value="0"/><br>    <maxInclusive value="45"/><br>  </restriction><br></simpleType> |
| MinTemperatureType | This simple type represents minimum temperature using centigrade. The restriction base is snvt:temp_pType. The value is restricted from −15 to 0.<br><simpleType name="MinTemperatureType"><br>  <restriction base="snvt:temp_pType"><br>    <minInclusive value="−15"/><br>    <maxInclusive value="0"/><br>  </restriction><br></simpleType> |

TABLE 16

| Name | Definition & Source |
| --- | --- |
| TemperatureType | This simple type represents temperature using centigrade.<br><simpleType name="TemperatureType"><br>  <restriction base="snvt:temp_pType"><br>    <minInclusive value="−15"/><br>    <maxInclusive value="45"/><br>  </restriction><br></simpleType> |
| SoundVolumeType | This simple type represents sound volume using decibel. The restriction base is snvt:sound_dbType. The value is restricted from 0 to 150db.<br><simpleType name="SoundVolumeType"><br>  <restriction base="snvt:sound_dbType"><br>    <minInclusive value="0"/><br>    <maxInclusive value="150"/><br>  </restriction><br></simpleType> |
| WindSpeedType | This simple type represents speed of wind using meter per second. The restriction base is snvt:speed_milType. The value is restricted from 0 to 20 mps.<br><simpleType name="WindSpeedType"><br>  <restriction base="snvt:speed_milType"><br>    <maxInclusive value="20"/><br>  </restriction><br></simpleType> |
| TurnSpeedType | This simple type represents turning speed using velocity. The restriction base is snvt:angle_velType. The value is restricted from 0 to 10<br><simpleType name="TurnSpeedType"><br>  <restriction base="snvt:angle_velType"><br>    <minInclusive value="0"/><br>    <maxInclusive value="10"/><br>  </restriction><br></simpleType> |

TABLE 17

| Name | Definition & Source |
| --- | --- |
| DiffusionType | This simple type represents mass using milligram. The restriction base is snvt:mass_milType. The value is restricted from 0 to 200.<br><simpleType name="DiffusionType"><br>  <restriction base="snvt:mass_milType"><br>    <maxInclusive value="200"/><br>  </restriction><br></simpleType> |
| ContrastType | This simple type represents contrast using the expression like 1000:1.<br><simpleType name="ContrastType"><br>  <restriction base="string"><br>    <pattern value="\d{4}:\d{1}"/><br>  </restriction><br></simpleType> |
| LevelType | This simple type represents percentage. The value is restricted from 0 to 100.<br><simpleType name="LevelType"><br>  <restriction base="unsignedInt"><br>    <minInclusive value="0"/><br>    <maxInclusive value="100"/><br>  </restriction><br></simpleType> |
| VibrationType | This simple type represents intensity of vibration using rpm. The restriction base is snvt:rmp_Type. The value is restricted from 0 to 20000.<br><simpleType name="VibrationType"><br>  <restriction base="snvt:rpm_Type"><br>    <maxInclusive value="20000"/><br>  </restriction><br></simpleType> |

Related to networks of sensory effects, SNVT related to Lonworks may be exemplarily defined as follows.

| SNVT_angle_deg (104) Phase/Rotation | | | |
| --- | --- | --- | --- |
| SNVT Index | Measurement | Type Category | Type Size |
| 104 | Angular distance | Signed Long | 2 bytes |
| Valid Type Range | Type Resolution | Units | Invalid Value |
| −359.98 ... 360.00 | 0.02 | degrees | 32,767 (0x7FFF) |

| SNVT_angle_deg (104) Phase/Rotation ||||
|---|---|---|---|
| Raw Range | Scale Factors | File Name | Default Value |
| −17.999 . . . 18.000 (0xB9B1 . . . 0x4650) | 2. − 2. 0 $S = a*10^{b}*(R + c)$ | N/A | N/A |

Here, "Valid Tpe Range" denotes that a range of set values is limited. "Type resolution" denotes a resolution for expressing values. "Unit" denotes a unit used in SNVT.

The method of the present invention described above can be realized as a program and stored in a computer-readable recording medium such as CD-ROM, RAM, ROM, floppy disks, hard disks, magneto-optical disks and the like. Since the process can be easily implemented by those skilled in the art to which the present invention pertains, further description will not be provided herein.

While the present invention has been described with respect to the specific embodiments, it will be apparent to those skilled in the art that various changes and modifications may be made without departing from the spirit and scope of the invention as defined in the following claims.

INDUSTRIAL USABILITY

The method and apparatus for generating and consuming sensory effect media according to the present invention is used to generate and consume the sensory effect media.

What is claimed is:

1. A method for generating sensory effect media, comprising:
  receiving sensory effect information about sensory effects that are applied to media; and
  generating sensory effect metadata including the received sensory effect information, wherein the sensory effect metadata includes effect description information for describing the sensory effects and device control description information for controlling devices that perform the sensory effects, wherein:
  the effect description information includes device identification information about the devices, and
  the device control description information includes:
    reference information about the device identification information,
    synchronization information for synchronizing the media with the sensory effects, and
    parameter information for controlling the devices.

2. The method of claim 1, further comprising transmitting the sensory effect metadata to a user terminal.

3. The method of claim 1, further comprising:
  generating sensory effect media by packaging the generated sensory effect metadata and the media; and
  transmitting the sensory effect media to the user terminal.

4. The method of claim 1, wherein the sensory effect information further includes general information having sensory effect metadata generation information about generation of the sensory effect metadata.

5. The method of claim 1, wherein the effect description information further includes:
  effect type information about types of the sensory effects; and
  condition information for devices that perform the sensory effects.

6. An apparatus for generating sensory effect media, comprising:
  an input unit for receiving sensory effect information about sensory effects that are applied to media; and
  a sensory effect metadata generator for generating sensory effect metadata including the received sensory effect information,
  wherein the sensory effect metadata includes effect description information for describing the sensory effects and device control description information for controlling devices that perform the sensory effects, wherein:
  the effect description information includes device identification information about the devices, and
  the device control description information includes:
    reference information about the device identification information,
    synchronization information for synchronizing the media with the sensory effects, and
    parameter information for controlling the devices.

7. The apparatus of claim 6, wherein the sensory effect information further includes general information having sensory effect metadata generation information about generation of the sensory effect metadata.

8. The apparatus of claim 6, wherein the effect description information further includes:
  effect type information about types of the sensory effects; and
  condition information for devices that perform the sensory effects.

9. A method for consuming sensory effect media, comprising:
  receiving sensory effect metadata including sensory effect information about sensory effects that are applied to media; and
  searching for devices that perform the sensory effects and controlling the devices according to the sensory effect information,
  wherein the sensory effect metadata includes effect description information for describing the sensory effects and device control description information for controlling devices that perform the sensory effects, and wherein:
  the effect description information includes device identification information about the devices, and
  the device control description information includes:
    reference information about the device identification information,
    synchronization information for synchronizing the media with the sensory effects, and
    parameter information for controlling the devices.

10. The method of claim 9, wherein in said receiving sensory effect metadata, the media is further received.

11. The method of claim 9, wherein the media is packaged with the sensory effect metadata.

12. The method of claim 9, wherein the sensory effect information further includes general information having sensory effect metadata generation information about generation of the sensory effect metadata.

13. The method of claim 9, wherein the effect description further information includes:
   effect type information about types of the sensory effects; and
   condition information for devices that perform the sensory effects.

14. An apparatus for consuming sensory effect media, comprising:
   an input unit for receiving sensory effect metadata having sensory effect information about sensory effects that are applied to media; and
   a controller for searching for devices that perform the sensory effects and controlling the devices according to the sensory effect information,
   wherein the sensory effect metadata includes effect description information for describing the sensory effects and device control description information for controlling devices that perform the sensory effects, and wherein:
   the effect description information includes device identification information about the devices, and
   the device control description information includes:
      reference information about the device identification information,
      synchronization information for synchronizing the media with the sensory effects, and
      parameter information for controlling the devices.

15. The apparatus of claim 14, wherein the sensory effect information further includes general information having sensory effect metadata generation information about generation of the sensory effect metadata.

16. The apparatus of claim 14, wherein the effect description information further includes:
   effect type information about types of the sensory effects; and
   condition information for devices that perform the sensory effects.

* * * * *